(12) United States Patent
Antonic

(10) Patent No.: US 7,900,411 B2
(45) Date of Patent: Mar. 8, 2011

(54) SHEAR WALL BUILDING ASSEMBLIES

(76) Inventor: James P. Antonic, Ft. Myers, FL (US)

( * ) Notice: Subject to any disclaimer, the term of this patent is extended or adjusted under 35 U.S.C. 154(b) by 521 days.

(21) Appl. No.: 11/356,482

(22) Filed: Feb. 17, 2006

(65) Prior Publication Data

US 2007/0193143 A1     Aug. 23, 2007

(51) Int. Cl.
*E04B 1/00* (2006.01)
(52) U.S. Cl. ........... 52/275; 52/281; 52/293.3; 52/481.1; 52/483.1; 52/764; 52/780
(58) Field of Classification Search ............ 52/261, 52/208, 783.1, 272, 275, 281, 282.1, 282.3, 52/282.4, 764, 765, 775, 780, 781, 481.1, 52/483.1, 211, 290, 293.3
See application file for complete search history.

(56) References Cited

U.S. PATENT DOCUMENTS

| | | | |
|---|---|---|---|
| 1,085,429 A | 1/1914 | Kahn et al. | |
| 1,609,541 A * | 12/1926 | Gooding | 52/834 |
| 1,958,124 A * | 5/1934 | Bemis | 165/56 |
| 1,959,135 A | 5/1934 | Miller | |
| 2,142,523 A | 1/1939 | McLaughlin, Jr. | |
| 2,256,394 A | 9/1941 | Lamel | |
| 2,321,221 A * | 6/1943 | Linehan | 403/230 |
| 2,356,309 A | 8/1944 | Garbe | |
| 2,363,164 A * | 11/1944 | Waller | 52/282.5 |
| 2,380,834 A * | 7/1945 | Goldman | 52/742.12 |
| 2,406,501 A | 8/1946 | Kratzmaier | |
| 2,731,116 A * | 1/1956 | Hamilton | 52/282.1 |
| 3,152,672 A * | 10/1964 | Oppenhuizen et al. | 52/292 |
| 3,184,013 A | 5/1965 | Pavlecka | |
| 3,293,813 A * | 12/1966 | Emmons et al. | 52/238.1 |
| 3,310,926 A * | 3/1967 | Brandreth et al. | 52/481.1 |
| 3,332,188 A | 7/1967 | Schaefer | |
| 3,363,371 A | 1/1968 | Villalobos | |
| 3,413,773 A * | 12/1968 | Fitzgerald | 52/713 |
| 3,498,014 A | 3/1970 | Fergen | |
| 3,533,205 A | 10/1970 | Pestal | |
| 3,562,970 A | 2/1971 | Schwartz | |
| 3,593,475 A | 7/1971 | LaGue | |
| 3,623,290 A | 11/1971 | Downing, Jr. | |
| 3,630,474 A | 12/1971 | Minor | |
| 3,685,222 A * | 8/1972 | Curtess | 52/92.2 |
| 3,744,199 A * | 7/1973 | Navarre | 52/481.2 |
| 3,821,868 A * | 7/1974 | Edwards | 52/241 |
| 3,877,194 A | 4/1975 | Matuschek et al. | |

(Continued)

FOREIGN PATENT DOCUMENTS

FR          2871823          12/2005

(Continued)

OTHER PUBLICATIONS

U.S. Appl. No. 11/249,650, filed Oct. 13, 2005, Antonic.

(Continued)

*Primary Examiner* — Brian E Glessner
*Assistant Examiner* — Adriana Figueroa
(74) *Attorney, Agent, or Firm* — Laura G. Barrow

(57) ABSTRACT

Novel building systems, in particular low cost superior strength building assemblies incorporating single or double shear walls, and disaster resistant window attachments are described herein. The inventive building systems are particularly well-suited for adding rooms to existing buildings, such as attached residential room additions, basements, disaster relief housing, and Do-It Yourself (DIY) projects.

17 Claims, 19 Drawing Sheets

U.S. PATENT DOCUMENTS

| | | | |
|---|---|---|---|
| 3,989,399 A | 11/1976 | Slowbe | |
| 4,047,355 A | 9/1977 | Knorr | |
| 4,107,893 A * | 8/1978 | Rensch | 52/775 |
| 4,124,186 A | 11/1978 | Call, Sr. | |
| 4,151,030 A * | 4/1979 | Hensel | 156/158 |
| 4,154,030 A * | 5/1979 | Huguet | 52/98 |
| 4,186,539 A | 2/1980 | Harmon et al. | |
| 4,199,908 A | 4/1980 | Teeters | |
| D256,663 S | 9/1980 | Gilb | |
| 4,235,054 A | 11/1980 | Cable | |
| 4,261,144 A * | 4/1981 | Rizzo | 52/63 |
| 4,272,930 A | 6/1981 | Foster | |
| 4,285,184 A | 8/1981 | Turner, Jr. | |
| 4,299,202 A | 11/1981 | Mayo et al. | |
| 4,324,082 A | 4/1982 | Rutkowski et al. | |
| 4,353,192 A | 10/1982 | Pearson et al. | |
| 4,370,838 A | 2/1983 | Vermillion | |
| D268,288 S | 3/1983 | Cowdroy | |
| 4,530,194 A * | 7/1985 | Linton et al. | 52/712 |
| 4,542,614 A | 9/1985 | Malachowski | |
| D283,352 S | 4/1986 | Bancroft | |
| 4,612,744 A | 9/1986 | Shamash | |
| D286,199 S | 10/1986 | Bancroft | |
| 4,630,547 A | 12/1986 | Przybylinski et al. | |
| 4,638,606 A * | 1/1987 | Wendt | 52/36.6 |
| 4,660,339 A | 4/1987 | Paz | |
| 4,689,930 A | 9/1987 | Menchetti | |
| 4,714,372 A | 12/1987 | Commins | |
| 4,744,192 A | 5/1988 | Commins | |
| D297,502 S | 9/1988 | Archambeau | |
| 4,812,075 A | 3/1989 | Lavin, Sr. | |
| D318,130 S | 7/1991 | Abbestam et al. | |
| 5,069,263 A * | 12/1991 | Edwards | 160/135 |
| 5,070,667 A | 12/1991 | Schulte | |
| 5,081,813 A | 1/1992 | White | |
| 5,092,100 A | 3/1992 | Lambert | |
| D330,432 S | 10/1992 | Weinerman | |
| D331,469 S | 12/1992 | McMarlin | |
| 5,260,525 A * | 11/1993 | Morse | 181/285 |
| D342,662 S | 12/1993 | Lavin, Sr. | |
| 5,307,603 A * | 5/1994 | Chiodo | 52/698 |
| 5,313,752 A * | 5/1994 | Hatzinikolas | 52/243 |
| 5,321,924 A * | 6/1994 | Smolik | 52/204.1 |
| D349,166 S | 7/1994 | Beard, Jr. | |
| 5,339,798 A | 8/1994 | Christian | |
| 5,375,384 A * | 12/1994 | Wolfson | 52/295 |
| 5,390,460 A | 2/1995 | Llorens | |
| 5,394,665 A | 3/1995 | Johnson | |
| 5,403,062 A | 4/1995 | Sjostedt et al. | |
| D358,755 S | 5/1995 | Davis | |
| 5,423,156 A | 6/1995 | Nellessen, Jr. | |
| D363,997 S | 11/1995 | Nomura | |
| D364,331 S | 11/1995 | Leek | |
| D371,208 S | 6/1996 | De Zen | |
| D371,505 S | 7/1996 | Young | |
| 5,561,955 A | 10/1996 | Frobosilo et al. | |
| D377,598 S | 1/1997 | Beard, Jr. | |
| 5,592,794 A | 1/1997 | Tundaun | |
| D378,422 S | 3/1997 | Howe | |
| 5,611,173 A | 3/1997 | Headrick et al. | |
| 5,644,888 A | 7/1997 | Johnson | |
| D384,169 S | 9/1997 | Leonelli | |
| 5,664,388 A | 9/1997 | Chapman et al. | |
| 5,678,797 A | 10/1997 | Gogan | |
| 5,706,620 A * | 1/1998 | De Zen | 52/220.2 |
| 5,706,626 A | 1/1998 | Mueller | |
| 5,735,090 A | 4/1998 | Papke | |
| 5,755,064 A * | 5/1998 | Meyer et al. | 52/174 |
| 5,758,466 A * | 6/1998 | Tucker | 52/586.2 |
| 5,794,746 A | 8/1998 | Ketonen et al. | |
| 5,797,233 A | 8/1998 | Hascall | |
| 5,799,454 A * | 9/1998 | Andersson et al. | 52/302.3 |
| 5,802,798 A | 9/1998 | Martens | |
| D400,080 S | 10/1998 | Beard, Jr. | |
| 5,837,363 A | 11/1998 | Colafati | |
| 5,848,512 A | 12/1998 | Conn | |
| 5,850,714 A * | 12/1998 | Liem | 52/293.3 |
| D407,828 S | 4/1999 | Hart | |
| 5,927,039 A | 7/1999 | De Boer | |
| 5,930,968 A | 8/1999 | Pullam | |
| 5,950,385 A | 9/1999 | Herren | |
| D417,737 S | 12/1999 | Stansfield | |
| 6,003,279 A | 12/1999 | Schneider | |
| 6,023,898 A | 2/2000 | Josey | |
| D423,690 S | 4/2000 | Grosfillex | |
| 6,067,769 A | 5/2000 | Hardy | |
| D428,162 S | 7/2000 | Eyring et al. | |
| 6,092,340 A | 7/2000 | Simmons | |
| D432,671 S | 10/2000 | Grossfillex | |
| 6,158,188 A * | 12/2000 | Shahnazarian | 52/702 |
| 6,216,395 B1 | 4/2001 | Kelly | |
| 6,223,494 B1 | 5/2001 | Bright | |
| D443,810 S | 6/2001 | Ausilio | |
| D445,921 S | 7/2001 | Eyring | |
| 6,256,960 B1 | 7/2001 | Babcock et al. | |
| 6,260,601 B1 | 7/2001 | Thomas | |
| D446,870 S | 8/2001 | Gardner | |
| 6,272,796 B1 | 8/2001 | Metzler | |
| 6,276,094 B1 | 8/2001 | Hays | |
| D447,574 S | 9/2001 | Fening | |
| D448,495 S | 9/2001 | Lamberts | |
| 6,298,612 B1 | 10/2001 | Adams | |
| 6,314,704 B1 | 11/2001 | Bryant | |
| D452,016 S | 12/2001 | Hall | |
| 6,336,298 B1 * | 1/2002 | Chou | 52/238.1 |
| 6,341,458 B1 | 1/2002 | Burt | |
| 6,415,580 B2 | 7/2002 | Ojala | |
| 6,427,403 B1 | 8/2002 | Tambakis | |
| 6,438,903 B1 | 8/2002 | Weiss | |
| D465,586 S | 11/2002 | Krieger | |
| D466,233 S | 11/2002 | Krieger | |
| 6,519,911 B1 | 2/2003 | Sawada | |
| D473,123 S | 4/2003 | Anderson | |
| D473,955 S | 4/2003 | Gregori | |
| 6,553,731 B2 | 4/2003 | Hsueh | |
| D474,286 S | 5/2003 | Gregori | |
| D474,549 S | 5/2003 | Krieger | |
| 6,581,337 B1 | 6/2003 | Skov et al. | |
| 6,625,945 B2 * | 9/2003 | Commins | 52/293.3 |
| 6,655,096 B1 | 12/2003 | Pryor | |
| 6,684,573 B2 | 2/2004 | Heath et al. | |
| 6,739,562 B2 | 5/2004 | Rice | |
| 6,754,999 B1 | 6/2004 | Urbanczk | |
| D492,889 S | 7/2004 | Craine | |
| 6,789,358 B2 | 9/2004 | Procton et al. | |
| 6,802,169 B2 | 10/2004 | Simmons | |
| 6,834,468 B1 | 12/2004 | Kroie | |
| D500,667 S | 1/2005 | Murphy et al. | |
| 6,837,012 B2 | 1/2005 | Scherrer et al. | |
| 6,837,019 B2 | 1/2005 | Collie | |
| 6,843,035 B1 * | 1/2005 | Glynn | 52/573.1 |
| 6,931,796 B2 | 8/2005 | Adriaansen et al. | |
| D511,086 S | 11/2005 | Craine | |
| D511,217 S | 11/2005 | Bullock et al. | |
| D523,565 S | 6/2006 | Antonic | |
| D523,735 S | 6/2006 | Craine | |
| 7,086,204 B2 | 8/2006 | Salzer | |
| D537,537 S | 2/2007 | Antonic | |
| 7,178,305 B2 | 2/2007 | Petrova | |
| D540,479 S | 4/2007 | Antonic | |
| 7,207,148 B2 | 4/2007 | Surowiecki | |
| D544,784 S | 6/2007 | Antonic | |
| D549,851 S | 8/2007 | Antonic | |
| D552,947 S | 10/2007 | Ewasiuk | |
| D553,261 S | 10/2007 | Antonic | |
| D553,761 S | 10/2007 | Antonic | |
| D554,273 S | 10/2007 | Antonic | |
| D554,773 S | 11/2007 | Antonic | |
| D554,774 S | 11/2007 | Antonic | |
| D554,775 S | 11/2007 | Antonic | |
| D555,259 S | 11/2007 | Antonic | |
| D555,467 S | 11/2007 | Pecoraro | |
| D557,429 S | 12/2007 | Bullock | |
| D561,353 S | 2/2008 | Antonic | |
| D561,354 S | 2/2008 | Antonic | |
| D561,355 S | 2/2008 | Antonic | |
| 7,334,377 B2 | 2/2008 | Dubensky et al. | |

| | | |
|---|---|---|
| D574,518 S | 8/2008 | Antonic |
| D574,697 S | 8/2008 | Green |
| D581,253 S | 11/2008 | Antonic |
| D588,440 S | 3/2009 | Antonic |
| 7,513,082 B2 | 4/2009 | Johnson |
| D606,384 S | 12/2009 | Antonic |
| 2002/0066245 A1 | 6/2002 | Pryor |
| 2002/0069600 A1 | 6/2002 | Bryant |
| 2002/0092245 A1 | 7/2002 | Floyd et al. |
| 2002/0148178 A1 | 10/2002 | Farag |
| 2003/0029124 A1 | 2/2003 | Wise |
| 2003/0089066 A1 | 5/2003 | Nelson |
| 2003/0217521 A1 | 11/2003 | Richardson et al. |
| 2004/0068947 A1 | 4/2004 | Commins et al. |
| 2004/0107653 A1 | 6/2004 | Collie |
| 2004/0163355 A1 | 8/2004 | Collie |
| 2004/0227039 A1 | 11/2004 | Real et al. |
| 2005/0011157 A1 | 1/2005 | Lutz et al. |
| 2006/0026924 A1 | 2/2006 | Madsen |
| 2006/0156660 A1 | 7/2006 | Stateson |
| 2006/0207209 A1 | 9/2006 | Metroyanis et al. |
| 2006/0254167 A1 * | 11/2006 | Antonic ................ 52/293.3 |
| 2007/0051059 A1 | 3/2007 | Ahearn |
| 2007/0094992 A1 | 5/2007 | Antonic |
| 2008/0236058 A1 | 10/2008 | Antonic |

FOREIGN PATENT DOCUMENTS

GB 507987 A 6/1939

OTHER PUBLICATIONS

U.S. Appl. No. 11/116,769, filed Apr. 28, 2005, Antonic.
U.S. Appl. No. 29/258,892, filed Apr. 28, 2006, Antonic.
U.S. Appl. No. 29/258,891, filed Apr. 28, 2006, Antonic.
U.S. Appl. No. 29/258,890, filed Apr. 28, 2006, Antonic.
U.S. Appl. No. 29/233,444, filed Jul. 1, 2005, Antonic.
U.S. Appl. No. 29/233,442, filed Jul. 1, 2005, Antonic.
U.S. Appl. No. 29/233,441, filed Jul. 1, 2005, Antonic.
PCT Written Opinion (PCT/US06/39754), Sep. 25, 2007, 11 pages total.
PCT Search Report (relevant sections) for PCT/US07/03998 (Sep. 9, 2008)(12 pages).
PCT Written Opinion (PCT/US06/15656), Jul. 7, 2008, 10 pages total.
European Search Report for EPO Application No. 07750810.9 (Mar. 3, 2010) (8 pages).
U.S. Appl. No. 29/273,324, filed Mar. 2, 2007, Antonic.

* cited by examiner

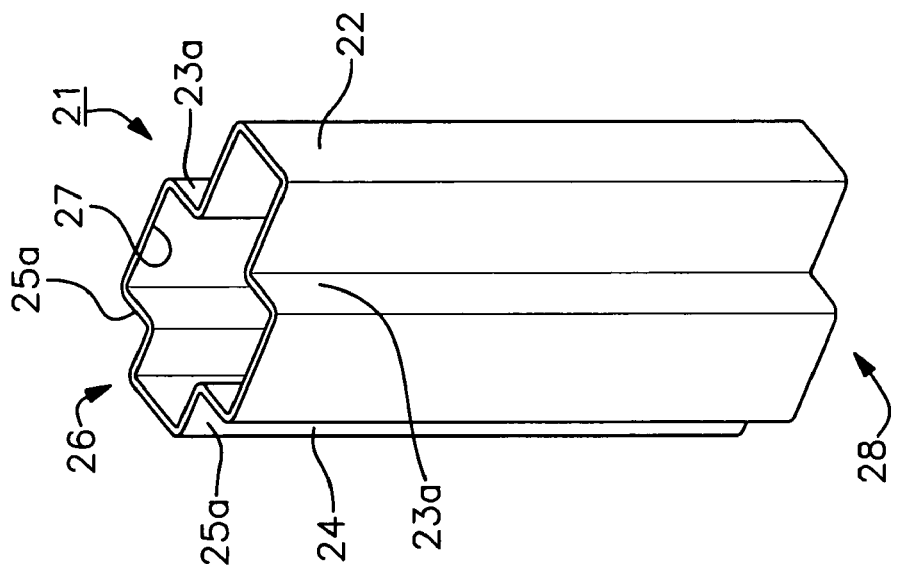
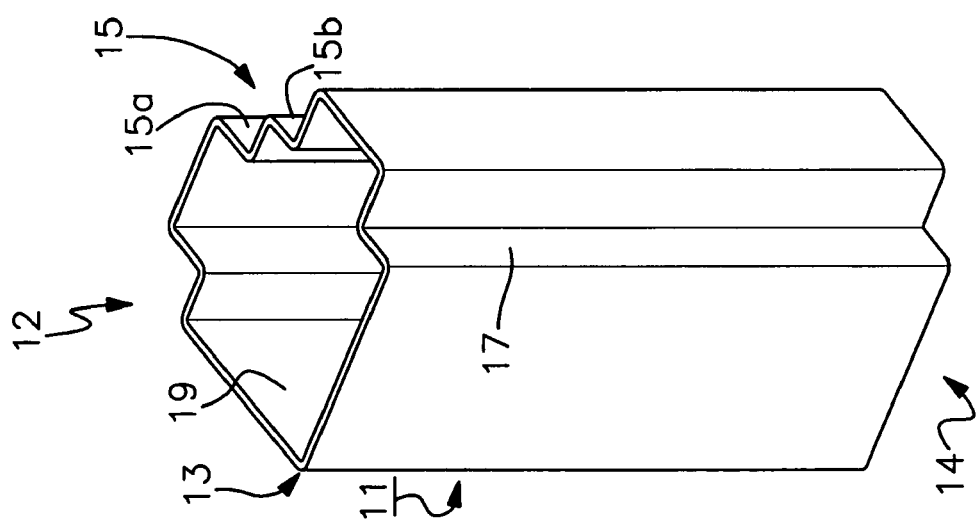

SHEAR WALL BUILDING ASSEMBLIES

SUMMARY OF THE INVENTION

The present invention is directed to a novel building systems, in particular low cost superior strength building assemblies incorporating single or double shear walls. Such systems are particularly well-suited for adding rooms to existing buildings, such as attached residential room additions and Do-It Yourself (DIY) projects. The inventive building systems are additionally well suited for adding self standing low cost outbuildings, for creating DYI housing shelters for enabling rapid erection of emergency buildings in disaster areas, for use as lightweight substantial military shelters. Another application of the inventive building systems is for use as basic housing in a wide variety of floor plans for affordable communities and as improved strength exterior housing structural support shells required as basic housing in developing nations. The inventive building systems are also well suited for constructing residential basements and other below and above grade support structures. In coastal areas and flood plains, the inventive building systems are useful as building support structures that elevate the buildings above flood levels or act as structural walls that would, with solid, open, cross-braced, or break-away sections, withstand hurricane or tsunami surge effects. A great advantage in the logistics of disaster recovery, for example, is to provide a structural building system that is easy to transport and erect quickly. The nesting profile shapes of the inventive structures enable many units to be stored in a small space prior to deployment, is a great advantage in the logistics of disaster recovery. The ability to assemble a hurricane wind resistant shell or earthquake resistant shell quickly, with little to no training, with simple tools, and at a low cost in a disaster aftermath also affords a superior benefit to the recovery efforts. Enabling homes for those who would normally not be able to afford them is an advance on the existing building methods. Using this inventive building system enables all of the above benefits.

In disaster zones, double shear wall construction pursuant to certain aspects of the present invention can be used to provide safe rooms against wind, fire, flying debris, attacks, or military ordinance. In combat zones, the inventive system can be quickly assembled using double shear wall construction separated by a space that can then be filled with bullet proof loose fill, such as sand, for example, or compounded materials such as reinforced concrete or resin bonded aggregate. Further features of the inventive building systems include the ability of the system to form a wide variety of exterior window and door layouts, door layouts in interior walls, and a wide variety of interior wall floor plan arrangements to be created without the use of additional parts. Any desired layout, fenestration, and access/egress can be created as the structure is being pieced together. Novel features of the inventive building systems include the method construction and profiles of the window and door openings that allow a wide variety of window types, sizes, and thicknesses to be easily accommodated into position utilizing a male/female interlock that is stronger and more resistant to hurricanes and tornados at lower cost than the current fenestrations available. Basic fenestrations of the inventive system do not rely on mechanical or adhesive fasteners to secure the window to the frame. While achieving superior attachment strength the window constructions are able to easily remove or replace damaged windows using ordinary hand tools. Another novel feature of the door and window systems is that newly developed high impact fenestration designs for hurricane resistant windows can also be integrated into the building exterior frame quickly and at a low cost without using mechanical or adhesive fasteners to secure the window within the framing. Security from outside entry is maintained in all the inventive designed fenestrations, yet incorporates with the ability to easily replace or repair the windows from the inside. This novel feature is not only applicable to the existing inventive structure but certain aspects of it are applicable to framing and walls made of wood, steel, concrete block, or cast concrete as well, thereby enabling those constructions to benefit from this novel feature while creating lower cost simply designed window installations to be used with, improved security, and easier servicing.

Another unique feature of the present invention is that the various structural parts, when formed of composite materials, are relatively light weight, very high strength, and are configured to allow dense stacking to enable condensed shipping of up to twenty small houses in a standard container, for example.

Specifically, in certain aspects, the present invention is directed to a shear wall building system comprising at least four corners posts, each of the posts arranged about a floor pad and each having a top end and a bottom end. Each of the corners posts further has a longitudinal outer body comprising four corners, the corners including (i) a pair of diagonally opposing corners; (ii) an outer most exterior corners positioned between the diagonally opposing corners, and (iii) an inner most corners located diagonally opposite the outer most exterior corners and between said pair of diagonally opposing corners. At least one of the corners posts has a hollow interior which may have housed therein a fill material (e.g. sand, grout, resin bonded aggregate, concrete, and any other material suitable for sound attenuation or thermal insulation).

The wall assembly further includes (a) a pair of exterior shear wall sheets secured to each of the corners posts, each of the shear wall sheets having a first outer edge secured to one of the diagonally opposing corners of one of the corners posts, each of the pair of exterior shear wall sheets oriented perpendicular to one another; and (b) a pair of interior shear wall sheets secured to each of the corners posts, each of the interior shear wall sheets having a first outer edge secured to the inner most corners of one of the corners posts, such that each of the pair of interior wall sheets are oriented perpendicular to one another and parallel to an immediately adjacent exterior shear wall sheet. More specifically, the diagonally opposing corners of each of the corners posts may include at least one longitudinal indentation extending from the top end to the bottom end of the corners post, the indentation configured to engage the outer edge of the exterior shear wall sheet. In addition, the inner most corners of each of the corner posts may include at least one longitudinal indentation extending from the top end to the bottom end of the corners posts, such that the interior indentation is aligned with and runs parallel to an adjacent longitudinal indentation of one of the exterior diagonally opposing corners.

The shear wall building system of the present invention further includes one or more longitudinal sill plates having opposite ends secured to adjacent corners posts along the floor pad; one or more shear wall connecting studs secured within each of the sill plates and positioned a distance from an adjacent corners post; and at least one horizontal top plate secured to the top ends of the studs and corners posts. The interior and exterior shear wall sheets each further have a second outer side edge secured to one of the shear wall connecting studs.

Certain embodiments of the connecting studs of the present invention each have an interior flange and an exterior flange, with the inventive building system further including (a) an interior non-shear wall sheet adjacent the interior shear wall sheet and secured to the interior flange of the connecting stud and the corner post; (b) an exterior non-shear wall sheet adjacent the exterior shear wall sheet and secured to the exterior flange of the connecting stud and the corners post; and (c) air spaces created between the exterior shear wall sheet and the exterior non-shear wall sheets and between the interior shear wall sheets and the interior non-shear wall sheets.

The shear wall building assembly may further include a quantity of insulation housed between the exterior and interior shear wall sheets and positioned such that a first air space is created between the interior shear wall sheet and insulation and a second air space is created between the exterior shear wall sheet and insulation.

The inventive building system thus described may further include at least one T-post secured to the sill plate and positioned adjacent to the stud or corner post, the T-post having a top end and a bottom end and two exterior longitudinal indentations extending from the top and bottom ends of the T-post, the exterior indentations oriented adjacent to one another and each configured to receive an outer edge of one of the exterior sheer wall sheets, the T-post further including two interior indentations adjacent to one another and each configured to receive an outer edge of one of the interior shear wall sheets and a second interior wall sheets, wherein the second interior wall sheet is oriented perpendicular to the interior shear wall sheet within the interior indentation. In certain embodiments, the T-post may have a hollow interior housing a fill material (e.g. sand, grout, resin bonded aggregate, concrete and other materials suitable for sound attenuation or thermal insulation).

When T-posts are employed, an interior non-shear wall sheet may be secured to the interior flange of the connecting stud and the T-post and exterior non-shear wall sheet may be secured to the exterior flange of the connecting stud and the T-post, with air spaces created between air spaces created between the exterior shear wall sheet and the exterior non-shear wall sheets and between the interior shear wall sheets and the interior non-shear wall sheets.

The bottom ends of each of the corner posts of the shear wall building system are preferably engaged within a footing submerged within the ground below the floor pad, the footing being further filled with a cement material. Specifically, the footing may comprise a base and an elongated tube extending from the base, with the corner post being secured within the tube and the base and tube being filled with a cement-containing material.

Other aspects of the present invention include a shear wall panel for use in building construction. The shear wall panel includes a pair of connecting studs, each of the studs having a top end, a bottom end, an exterior end, and an interior end, the exterior and interior ends having at least one longitudinal channel extending from the top end to the bottom end of the stud. The shear wall panel includes exterior and interior wall sheets, the exterior shear wall sheet having outer side edges, each of the outer side edges engaged in one of the exterior longitudinal channels of one of the studs. The interior shear wall sheet also includes outer side edges, each of outer side edges engaged in one of the interior longitudinal channels of one of the studs. The panel also includes a fill material housed between the interior and exterior shear wall sheets. The fill material may include any material suitable for thermal insulation and sound attenuation, sand, cement bonded aggregate, resin bonded aggregate, and soil. In other embodiments of the inventive shear wall panel, the fill material may be positioned between the interior and interior shear wall sheets to create a first air space between the interior shear wall sheet and fill material and a second air space between the exterior shear wall sheet and fill material. In certain embodiments, the fill material may comprise a block of expanded polystyrene prills (EPS) encased between the shear wall sheets.

The shear wall panel may further include (a) an interior non-shear wall sheet adjacent the interior shear wall sheet and secured to interior flanges of adjacent connecting studs; (b) an exterior non-shear wall sheet adjacent the exterior shear wall sheet and secured to exterior flanges of adjacent connecting studs; and (c) air spaces created between the exterior shear wall sheets and exterior non-shear wall sheets and between the interior shear wall sheets and interior non-shear wall sheets.

The exterior and interior ends of each pair of connecting studs of the inventive shear wall panel may further comprise one or more of longitudinal channels extending from the top end to the bottom end of the studs, each pair of channels configured to receive an outer side edge of a sheer wall sheet. In addition, the exterior end of each of the connecting studs may include an exterior flange and at least one intermediate flange extending from a central web portion of the stud to form the exterior longitudinal channel, the interior end of each of the connecting studs including an interior flange and at least one intermediate flange extending from the web portion to form the interior longitudinal channel. The exterior end of each of the connecting studs may further include one or more intermediate flanges extending from the central web portion to create a pair of exterior longitudinal channels, each channel configured to receive an outer edge of a shear wall sheet, and wherein the interior end of each of the connecting studs includes a pair of intermediate flanges extending from the central web portion to create a pair of interior longitudinal channels, each of the interior channels configured to receive an outer edge of a shear wall sheet.

The present invention is also directed to novel window fenestration assemblies that may be incorporated within the inventive building systems described herein or in other conventional building systems. In certain aspects of the present invention, the window fenestration assembly comprises (a) a top horizontal member and a bottom horizontal member each secured to a pair of vertical members and (b) a window assembly comprising a window surrounded and encased by a frame. The bottom horizontal member further comprises a pair of interior and exterior flanges secured to one another by a central web portion, the web portion comprising a top surface and a lower surface, the top surface, in combination with the flanges, forming a female receptacle for the window frame. In addition, the bottom horizontal member may also include a pair of intermediate flanges extending downward from the lower surface of the web portion and oriented with respect to the interior and exterior flanges to create a pair of interior and exterior indentations, each of the indentations configured to receive an underlying shear wall sheet therein. The fenestration assembly includes one or more pads positioned upon the top surface of the web portion and upon the pair of vertical members, the window assembly positioned against the pads. The fenestration assembly includes at least one chamber formed between one of the stud flanges and the window frame along the bottom horizontal member. A jamb is further provided to enclose the chamber. The fenestration assembly further includes at least one fill strip housed within the chamber(s) and may also include a quantity of loose fill material (e.g. of fiberglass, mineral wool, and foam insulation) dispersed within gaps created between adjacent pads and between the window frame and the horizontal and vertical members of the window fenestration assembly.

Other embodiments of the inventive window fenestration assembly include (a) a top horizontal member and a bottom horizontal member each secured to a pair of vertical members and (b) an elongated female C-channel member secured to an upper surface of the bottom horizontal member, with the bottom horizontal member further comprising a pair of interior and exterior flanges secured to one another by a central web portion, the flanges and web portion, in combination, comprising a mating surface for the female C-channel member. The female C-channel member further comprises a first upwardly extending channel and a second downwardly extending channel mating with the first channel. This second embodiment of the inventive window fenestration assembly also includes (a) one or more pads positioned within the first channel of the female C-channel member and upon the pair of vertical members, the window assembly positioned against the pads and (b) a chamber created between the upper surface and exterior flange of the bottom horizontal member and the first channel of the C-channel member. The fenestration assembly includes at least one fill strip housed within the chamber and may also include quantity of loose fill material (e.g. of fiberglass, mineral wool, and foam insulation) dispersed within gaps created between adjacent pads and between the window frame and the top horizontal member, vertical members, and C-channel member of the window fenestration assembly.

Alternatively, another embodiment of the inventive window fenestration assembly comprises a top horizontal member and a bottom horizontal member each secured to a pair of vertical members. Each of the horizontal and vertical members further include a pair of interior and exterior flanges secured to one another by a central web portion, thereby creating an interior female receptacle and an exterior female receptacle. The window fenestration assembly includes a window assembly comprising a window surrounded and encased by a frame, the window assembly engaged within the interior female receptacle of the horizontal and vertical members. The vertical and horizontal members are further secured to edges of a solid wall that forms the opening for the window fenestration assembly, wherein the edges of the solid wall are engaged within the exterior female receptacles of the horizontal and vertical members. One or more pads are positioned within the interior receptacles of the horizontal and vertical members, wherein the window assembly is positioned against the pads. The fenestration assembly includes at least one chamber formed between one of the stud flanges and the window frame along the bottom horizontal member. A jamb is further provided to enclose the chamber. The fenestration assembly further includes at least one fill strip housed within the chamber(s) and may also include a quantity of loose fill material dispersed within gaps created between adjacent pads and between the window frame and horizontal and vertical members of the window fenestration assembly. The solid wall to which this embodiment of the fenestration assembly may be secured includes solid pre-cast concrete slabs, hollow concrete blocks, structural insulated panels, and skeletal support walls.

BRIEF DESCRIPTION OF THE FIGURES:

FIG. 1 is a perspective view of the corner post of the present invention.

FIG. 2 is a perspective view of a T-post of the present invention used to create the junction for interior walls or structural supporting walls.

DETAILED DESCRIPTION OF THE EMBODIMENTS

Figure 6:
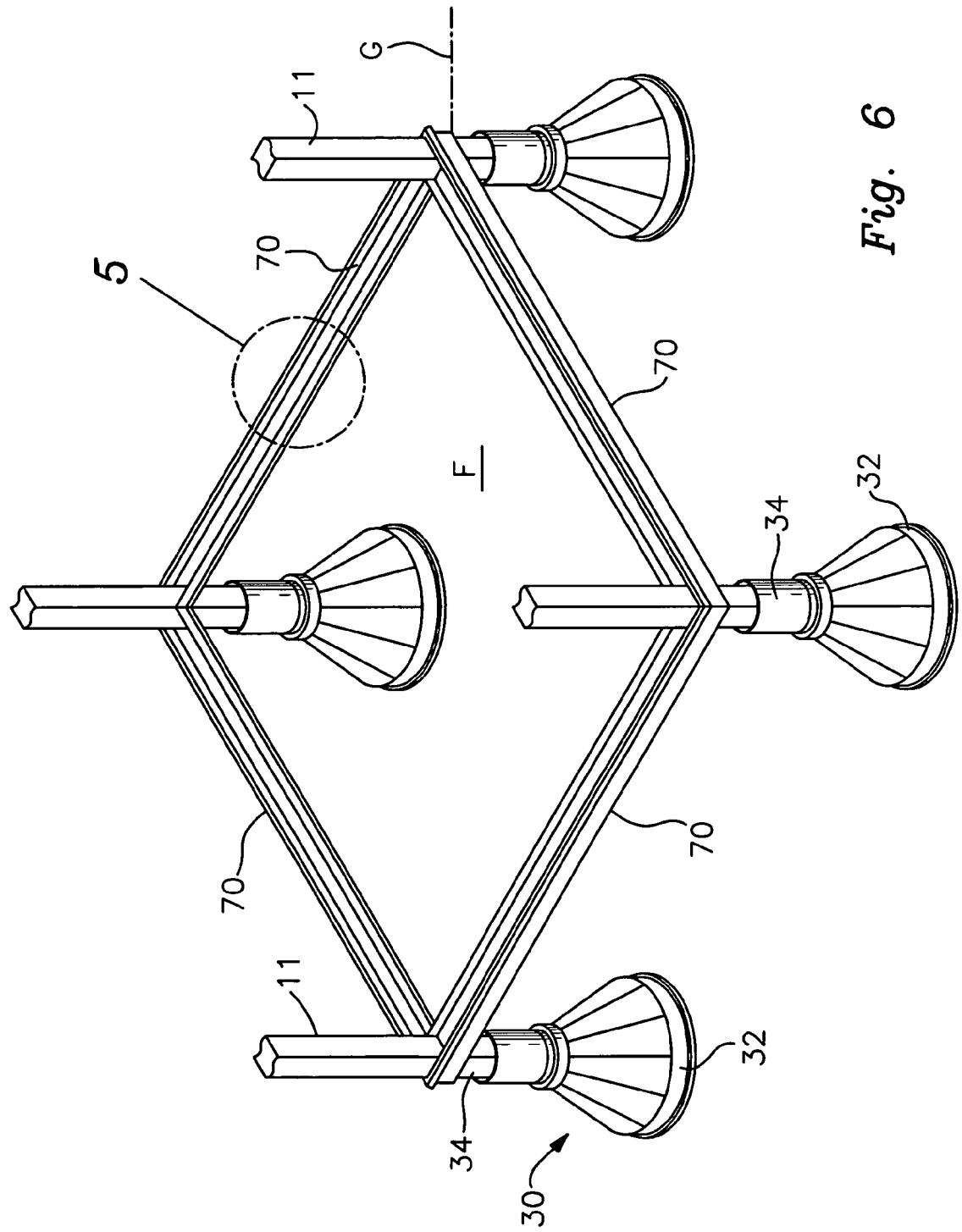
FIG. 6 is a perspective view of the four corners posts engaged within a footing mechanism and exterior sill plates attached to the corners posts.
Figure 7:
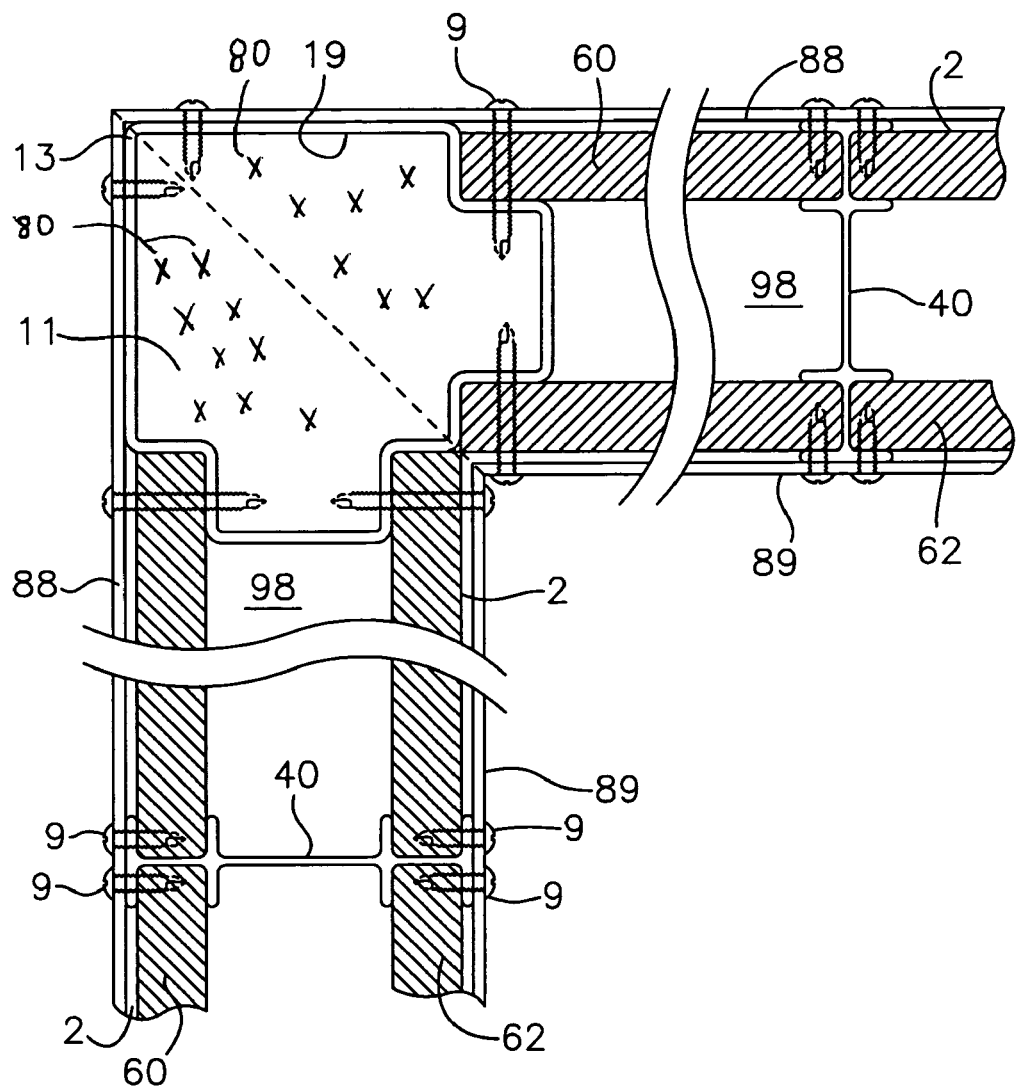
FIG. 7 is a top sectional view of a corners section of the building, illustrating interior and exterior shear wall sheets secured to a corners post and two types of shear wall connecting studs.

Referring now to the figures, the present invention is directed in part to an easy to assemble building system that incorporates novel structural stud designs and corner post designs in the assembly of the shear wall panels forming the building system. As shown in FIGS. 1, 6, and 7, the inventive building system comprises at least four corner posts 11 arranged about a concrete floor pad F. As shown in the figures, the corner posts are preferably submerged underground beneath the floor pad within footings 30, as discussed in greater detail below with respect to the method of assembling the components of the inventive building assembly. The corner posts preferably have a hollow interior 19 which may be subsequently filled with a fill material 80 suitable for sound attenuation, thermal insulation, fire proofing, or increased load strength. Exemplary fill materials 80 include, but are not limited to, concrete, grout, sand, dirt, fiberglass, foam insulation, mineral wool, and the like.

Each corners post 11 has a pair of diagonally opposing corners which are preferably longitudinal L-shaped indentations 17, as best shown in FIGS. 1 and 7. These corners 17 are configured to engage the outer edges of an exterior wall sheet, preferably an exterior shear wall sheet 60 as shown in FIGS. 7 and 8C. The wall sheet may be fastened to the corners from the outside via adhesives and/or screws 9, as shown. The corners post also includes an outer-most corners 13 and an inner most corners 15 located diagonally opposite the outer corners 13, as shown. Preferably, the inner-most corners 15 comprises at least one L-shaped indentation 15$a$ similar to the adjacent indentations 17. The inner indentations 15$a$ are configured to engage the outer edges of an interior wall sheet 62, preferably a shear wall sheet. As shown best in FIGS. 7 and 8C, the interior wall sheets 62 are oriented perpendicular to one another and parallel to an immediately adjacent exterior wall sheet 60.

Figure 3:
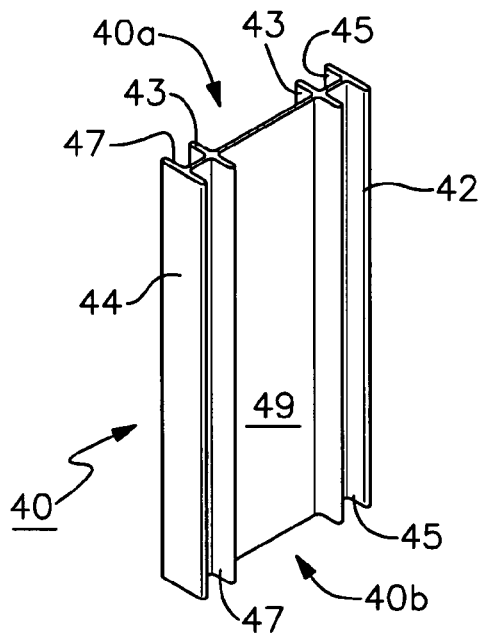
FIG. 3 is a perspective view of one embodiment of the shear wall connecting studs of the present invention.
Figure 4:
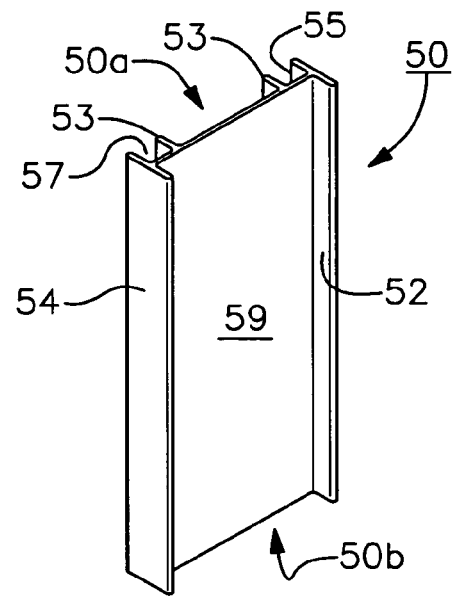
FIG. 4 is a perspective view of a second embodiment of the shear wall connecting studs of the present invention.
Figures 3A, 4A:
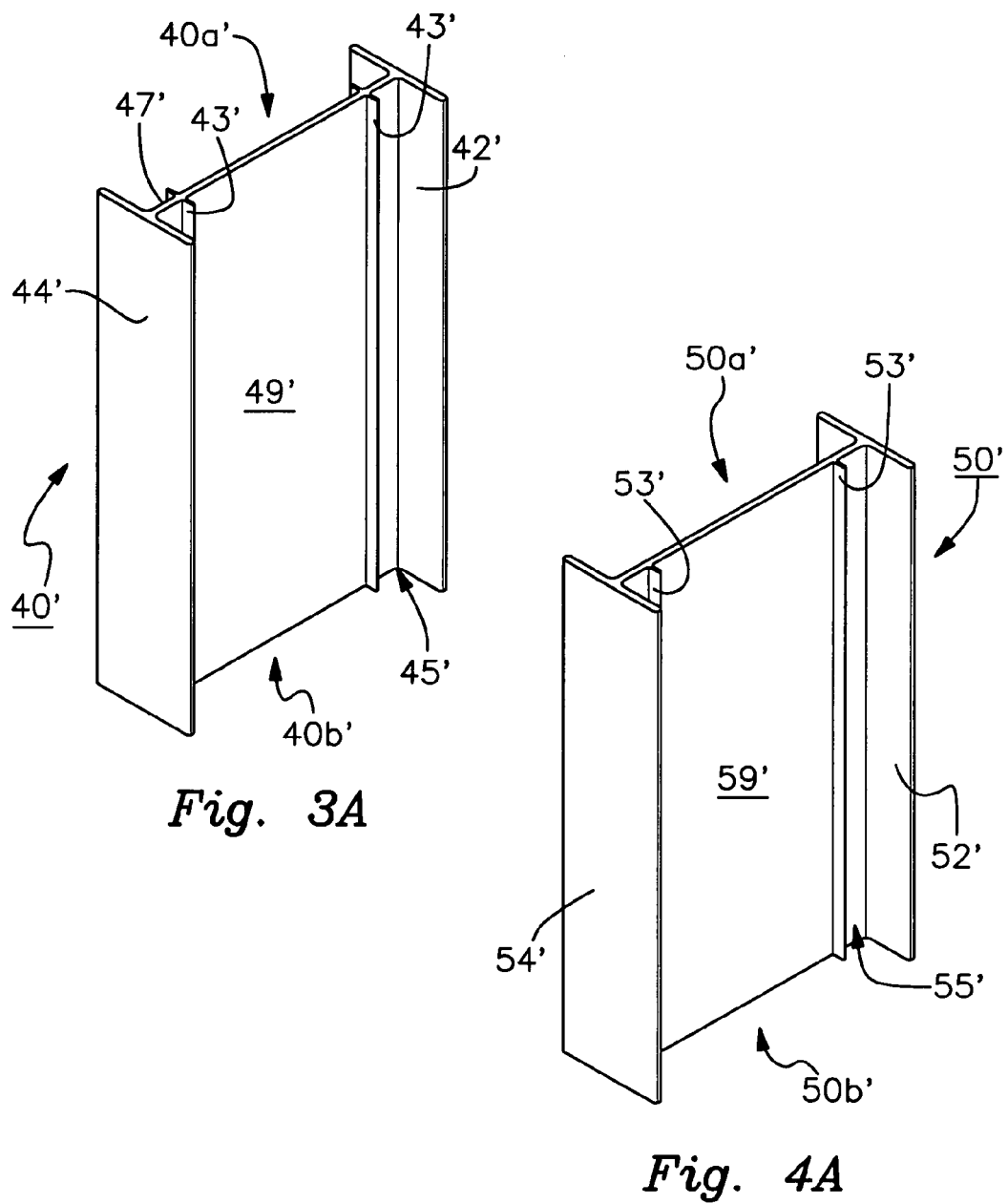
FIG. 3A is a perspective view of a slightly modified version of the stud shown in FIG. 3.
FIG. 4A is a perspective view of a slightly modified version of the stud shown in FIG. 4.

The opposite outside edges of the interior and exterior shear wall sheets are secured to a wall connecting stud 40, as shown in FIGS. 7 and 8C. In a preferred embodiment, the stud 40 includes a top end 40$a$ and a bottom end 40$b$ as well as an exterior end comprising an exterior flange 44 and an interior end comprising an interior flange 42 (FIGS. 3-3A). Each of the ends has a longitudinal channel 45, 47, each channel defined by outer flanges (i.e. exterior 44 and interior 42 flange) in combination with intermediate flanges 43, (FIG. 3) extending from a longitudinal central web portion 49 of the stud, as shown. FIG. 3 illustrates one embodiment of the stud wherein channels 45, 47 extend on each side of the web portion 49 in order to accommodate shear wall sheets on each side of the web portion 49. The stud $40^1$ shown in FIG. 3A is similar to that shown in FIG. 3, except the intermediate flanges $43^1$, are much smaller. The remaining components of the stud (i.e. channel $45^1$, $47^1$, top and bottom ends $40^1a$, $40^1b$, flanges $42^1$, $44^1$ and web portion $49^1$) remain the same. FIG. 4 illustrates another stud embodiment 50, also having top 50$a$ and bottom ends 50$b$ as well as exterior 54 and interior 52 flanges. Unlike the stud 40, the stud 50 only has intermediate flanges 53 extending from one side of the web portion 59 to form channels 55, 57. The stud $50^1$ shown in FIG. 4A is similar to the stud 50 design shown in FIG. 4, except the intermediate flanges $53^1$ are much smaller (the remaining components of the stud-channel $55^1$, $57^1$, top and bottom ends $50^1a$, $50^1b$, flanges $52^1$, $54^1$ and web portion $59^1$) remain the same. These latter embodiments (i.e. stud designs shown in FIGS. 4-4A) is preferred for forming the jamb surrounding a door way or window opening of the framing, with the flanges 53, $53^1$ oriented toward the shear wall panels, and the side of the web portion 49 without intermediate flanges 53, $53^1$ being oriented toward the interior of the rough opening of the window or door way. In both stud embodiments, the side edge of a shear wall sheet is engaged within the channels 45, 47, 55, 57.

As discussed in more detail below, the wall connecting studs 40, 50 are secured within a sill plate 70 or a C-channel bottom plate 86$b$ that is either fastened to or embedded within the floor pad F. For ease of explanation, the remaining discussion will refer to the use of a sill plate. Consequently, "sill plate," as used herein, shall mean and include the designs illustrated herein, in the Inventor's Co-Pending Applications (as later defined herein), the C-channel bottom plates 86$b$ shown herein and in the Inventor's Co-Pending Applications, as well as other conventional sill plates now known or later developed. For example, while FIG. 8C shows both the employment of the inventive sill plate 70 and C-channel bottom plate 86$b$, either or both (as shown) types of plates 70, 86$b$ may be employed for the two corner wall sections shown.

Figure 8:
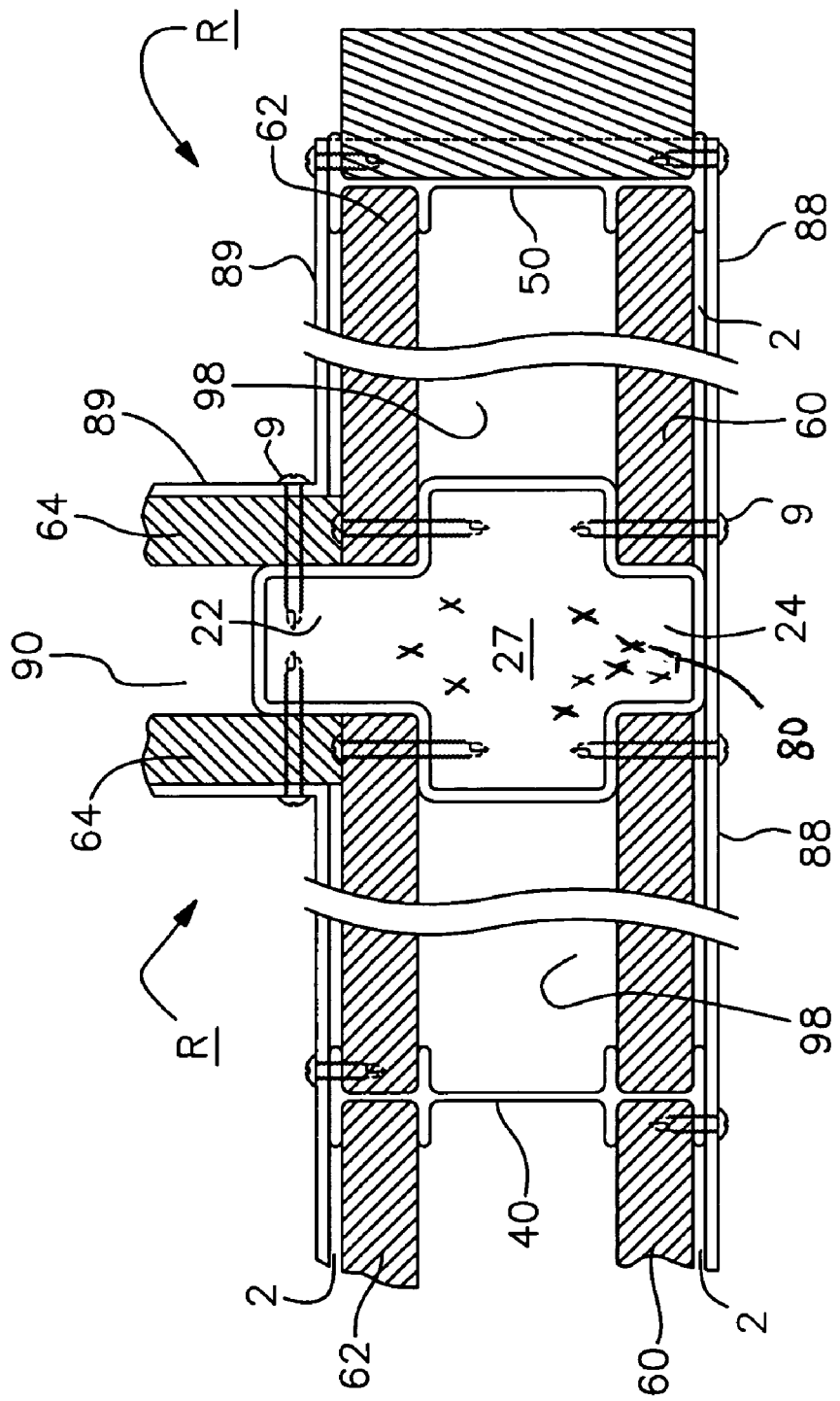
FIG. 8 is a top sectional view of an inner section of the building, illustrating interior and exterior shear wall sheet secured to a T-post and shear wall connecting studs.
Figure 8A:
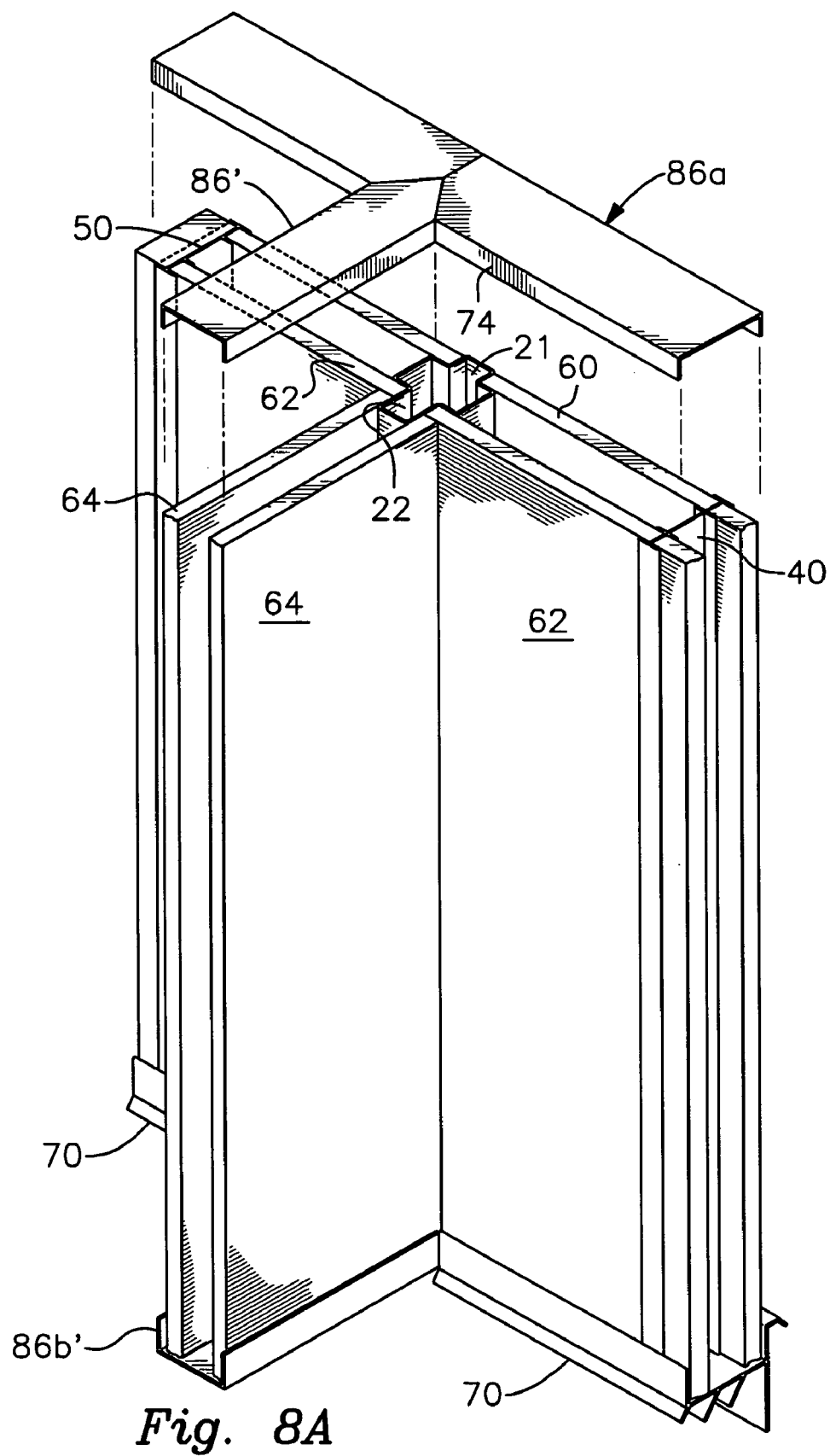
FIG. 8A is perspective view of a section of the assembled building showing the shear wall sheets seated within sill plates of the present invention.
Figure 8B:
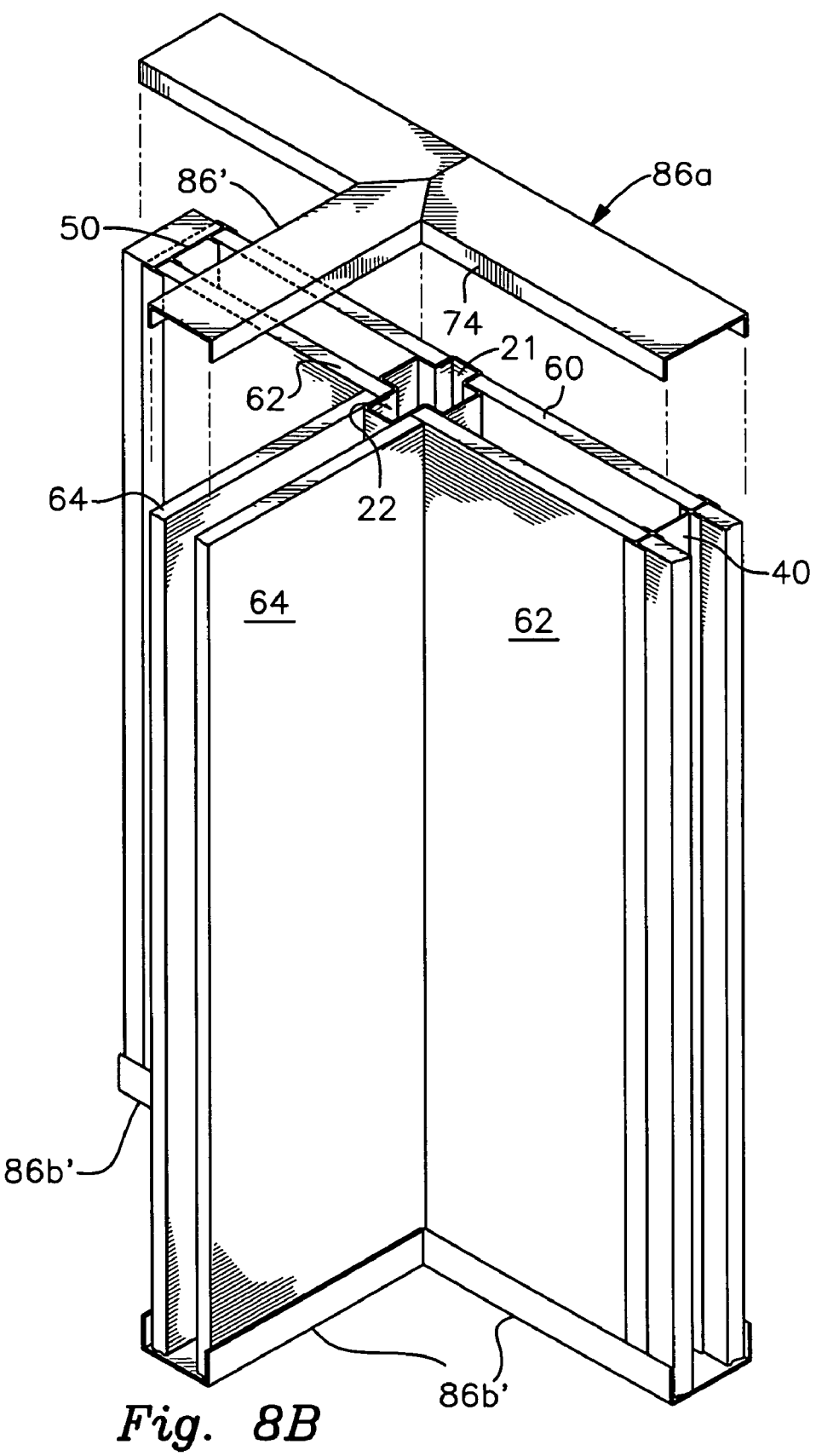
FIG. 8B is perspective view of a section of the assembled building similar to that shown in FIG. 8A, but instead showing the shear wall sheets seated within simple C-channel plates of the present invention.
Figure 8C:
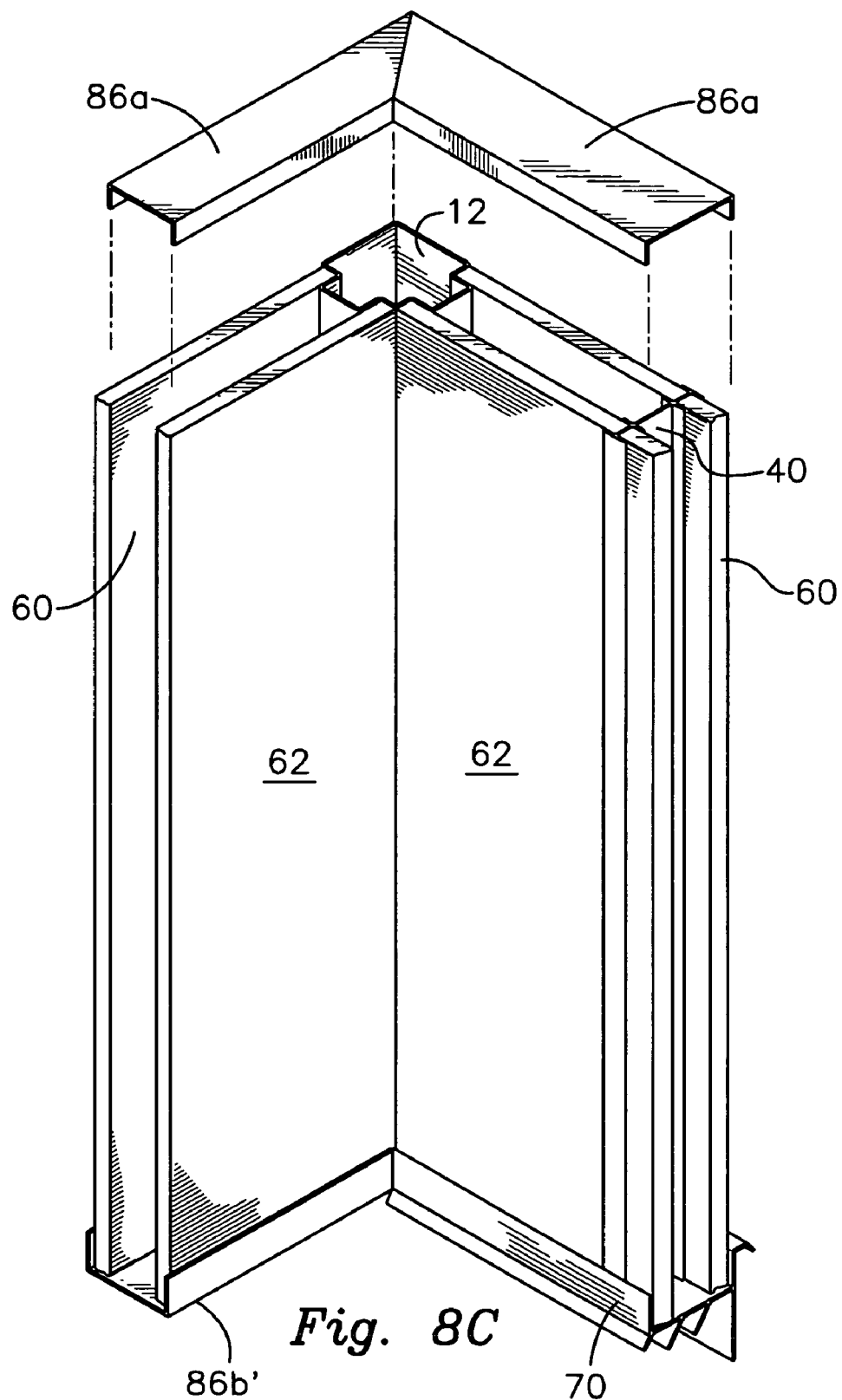
FIG. 8C is a perspective view of a corners section of the assembled building showing the shear wall sheets seated within both a sill plate of the present invention and a simple C-channel plate.
Figure 15:
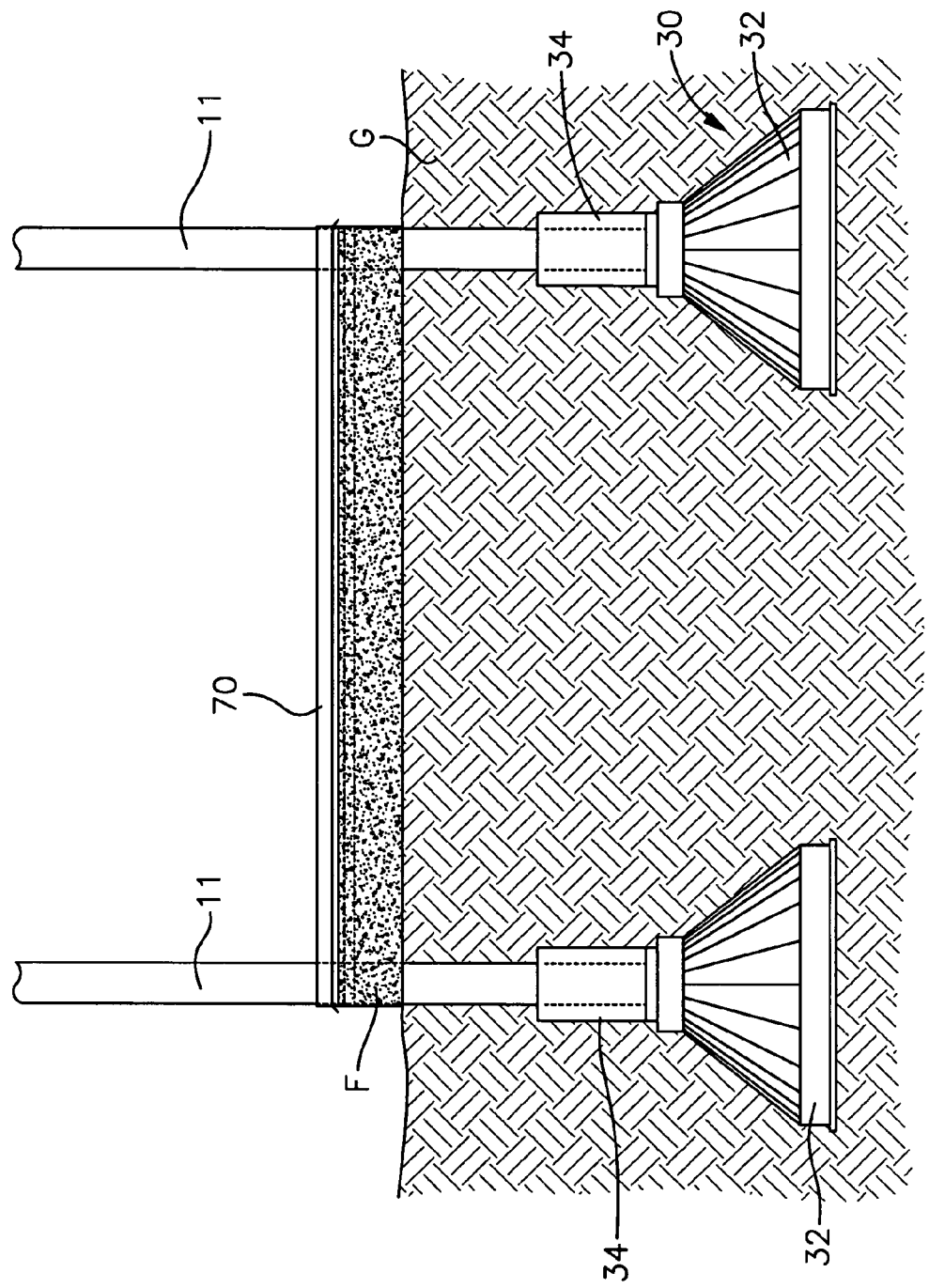
FIG. 15 is a side view of FIG. 6, showing two of the footings submerged beneath the ground.

To frame out an interior room or to create a structural support wall of a building, a T-shaped wall joining post 21 (hereinafter referred to as "T-post") is employed, as shown in FIGS. 2 and 8, for example. A section is cut out of the interior wall 74 of the sill plate 70, and a C-channel bottom plate 86$b$ is fixed to the floor pad F, mating with the sill plate 70 to accommodate the interior portion 22 of T-post 21 (see FIG. 15). The T-post 21 is positioned adjacent a shear wall connecting stud 40, 50 as shown in FIGS. 8, 8A, and 15, or adjacent a corner post (FIG. 8C). Like the corner post 11, the T-post 21 has a top end 26, a bottom end 27, and two exterior longitudinal L-shaped indentations 25$a$ extending the length of the post (i.e. from the top end 26 to the bottom end 28). The exterior indentations are oriented adjacent to one another and are each configured to receive an outer edge of an exterior wall sheet 60, as shown in FIGS. 8 and 8A. The T-post 21 further includes two interior indentations 23$a$ adjacent to one another, each configured to receive an outer edge of an interior shear wall sheet 62 (running parallel to an opposite exterior wall sheet 60 as best shown in FIGS. 8 and 15) as well as a second interior wall sheet 64, preferably a shear wall sheet, running perpendicular to the interior shear wall sheet 62 to form the structural attachment from the interior wall to the exterior wall and to divide one or more interior rooms, referenced generally at R in FIG. 8.

Figure 10A:
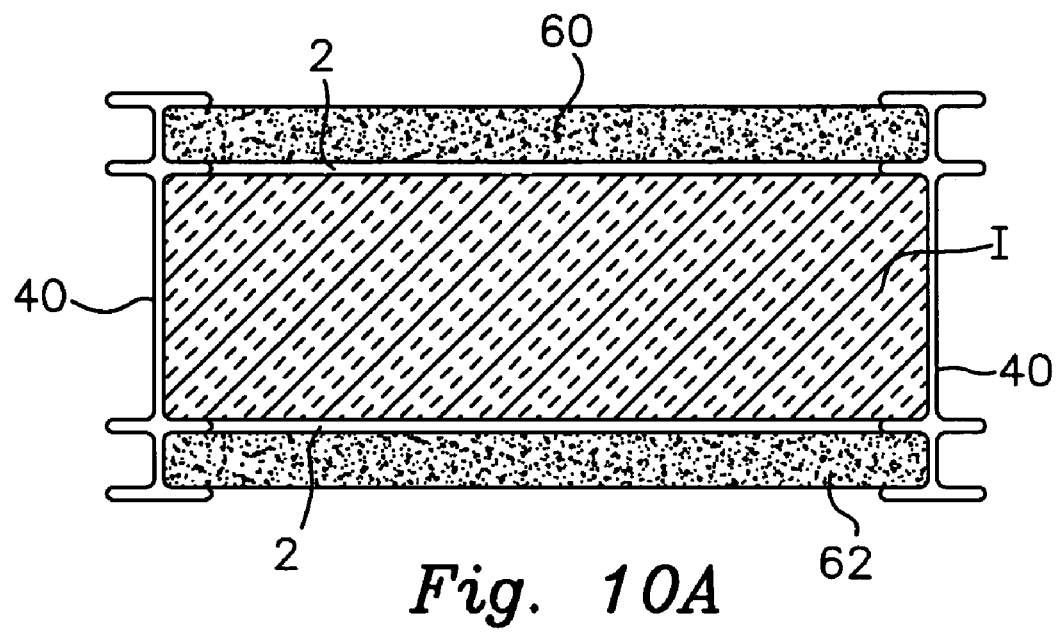
FIG. 10A is a top sectional view of a shear wall panel section of the present invention.
Figure 10B:
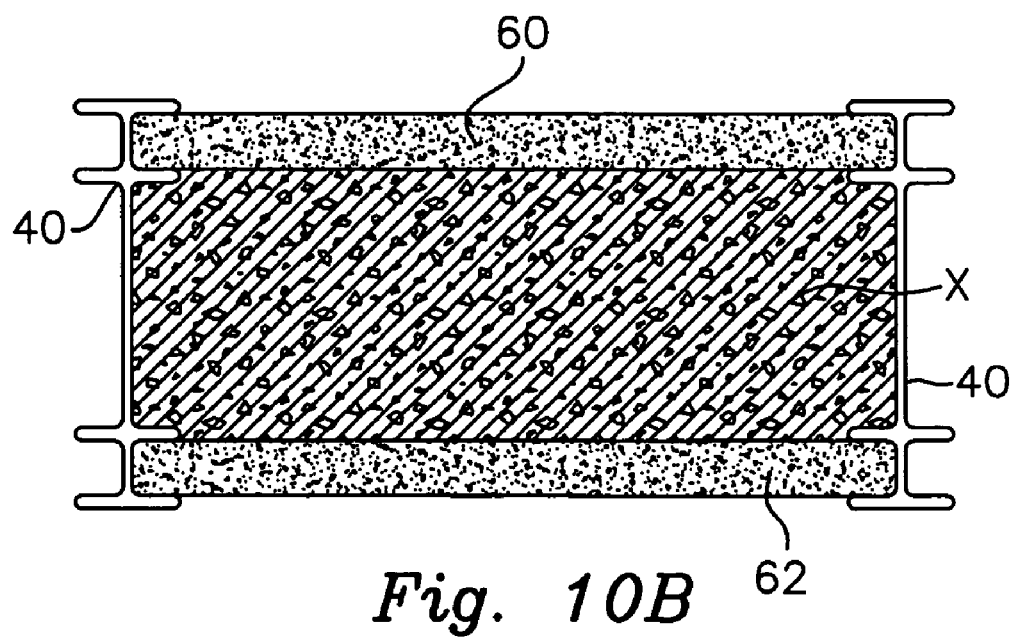
FIG. 10B is a top sectional view of a second shear wall panel section of the present invention.
Figure 10C:
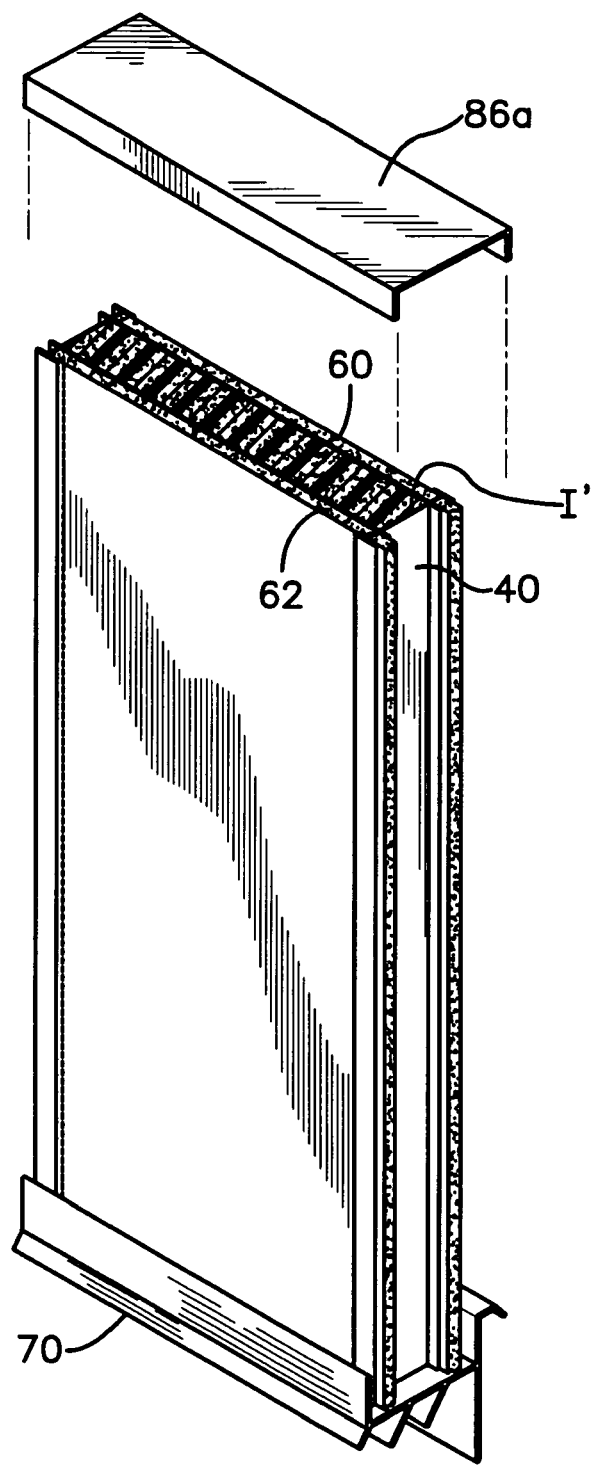
FIG. 10C is a perspective view of the shear wall panel similar to that shown in FIG. 10A, wherein the insulation material is a block of expanded polystyrene prills (EPS) in phantom.

The space 98 between adjacent shear walls in the building system (see FIGS. 7-8) may remain hollow or be filled with a solid or packaged insulation material I as shown in FIG. 10A. The space 98 may also be filled with soil, sand, cement bonded aggregates, resin bonded aggregates, or other materials X suitable for thermal insulation, sound attenuation, increased load strength, and/or fire proofing, as shown in FIG. 10B. Similarly, the interior 27 of the T-posts 21 and interior 19 of the corner posts 11 may be filled with similar fill materials as desired for thermal insulation, sound attenuation, increased load strength, and/or fire proofing. Exemplary materials include, but are not limited to, various aggregate materials, such as sand, small rocks; various insulation materials such as closed cell and open cell foam, rock wool, expanded polystyrene prills (EPS) or fiberglass; mixtures of resin binders such as polyurethane, phenolic, polyester, sodium silicate, and the like, bonded with sand or other aggregate material; various cement mortar mixtures, cement concrete, and bonded flowable fills such as cement or resin bonded waste materials such as fly ash, slag, or other waste material residues. In one embodiment, as shown in FIG. 10C, the use of EPS blocks $I^1$ (shown in part in phantom lines) between the studs 40 and shear panels 60, 62 replaces structural insulated panels (SIPS) commonly used in the prior art. Typical SIP panels comprise an EPS block coated with an adhesive on both sides, after which the shear panels are applied and the sandwiched panel is stacked and pressed until the adhesive is cured. In the present invention, as shown in FIG. 10C, the adhesives, coating, tacking, pressing, and curing are eliminated by encasing the EPS block $I^1$ within the shear panels 60, 62, the top plate 86*a*, panel stud interlocks as described in the Inventor's Co-Pending Applications as defined below, and studs 40 (or T-posts) that are mechanically or adhesively fastened to the edges of the shear panels, thereby effectively encapsulating and containing the insulating EPS between the shear panels.

Figure 16:
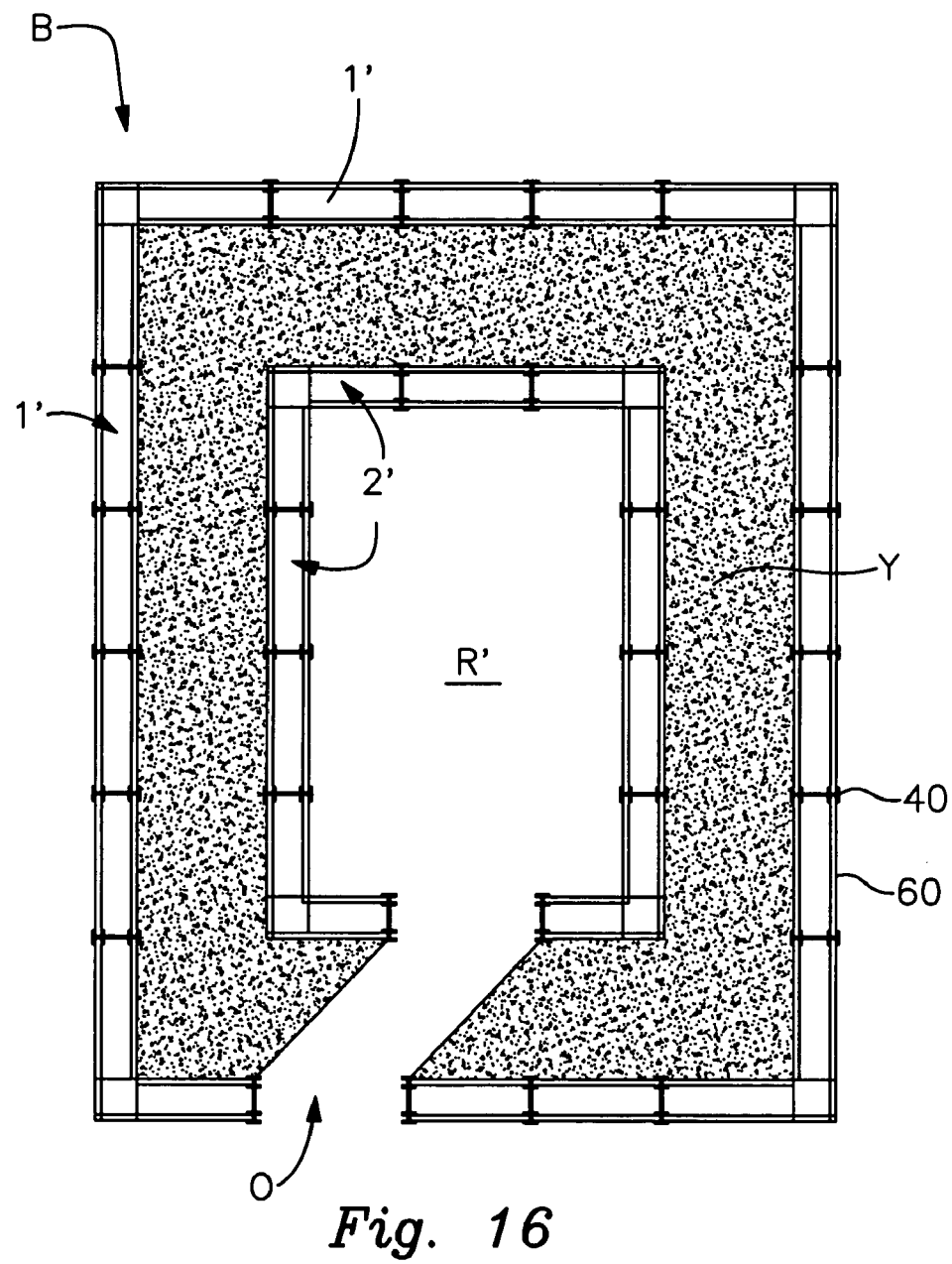
FIG. 16 is a top view of a building layout using the inventive shear walls and connecting studs, wherein two sets of double shear walls are arranged to form an inner room, with the space created between the two sets of walls containing a fill material suitable for providing added strength.

These same fill materials may also be used to fill the hollow interiors 19, 27 of the corner posts and T-posts, or spaces 2 where the double shear walls 60, 62 may be used as one set of shear sheets (see FIGS. 7-8) or built as two parallel walls $1^1$, $2^1$ containing two sets of shear wall sheets 60, 62 separated by a space Y between the two parallel walls to provide safe havens for category 5+ storms, safe rooms, or bullet resistant rooms in combat areas, for example, as illustrated in FIG. 16. As shown in FIG. 16, the building B comprises an interior room $R^1$ with an entrance way leading into the room referenced generally at O.

The corner posts 11, T-posts 21, and shear wall connecting studs 40, 50 are all preferably composite pultrusions, the composite materials that may be employed being those described in the present inventor's co-pending U.S. patent application Ser. No. 11/116,769 (filed Apr. 28, 2005) and Ser. No. 11/249,650 (filed Oct. 13, 2005), both of which are incorporated by reference herein in their entireties and collectively referred to herein as "Inventor's Co-Pending Applications." Similarly, the shear wall sheets may be formed of any material commonly used in the building construction industry suitable for use in fabricating shear walls, including, but not limited to, concrete board, plywood, Oriented Strand Board (OSB), Hardi Board, cementitious boards, backer boards, Masonite boards, fiberglass boards, gypsum boards, ceramic boards, MgO/MgCl DRAGONBOARD (manufactured by Pioneer Building Products of Taishan, Ltd., Guangdong, China; distributed by Fairmount Distributors, Jersey City, N.J.), fiberglass reinforced plaster boards, metal clad boards and boards fabricated from adhered layers of metals, sheeted cloth, woven fibers, insulation, wood, or similar sheeted materials. The preferred shear panel material is DRAGONBOARD. For increased penetration resistance, bonded fabrics of Aramid (Kevlar), fiberglass, carbon fiber, basalt, and special purpose exotic materials and the like which may be combined with organic and inorganic materials as part of a resistive barrier wall assembly designed to resist category 5 storms, tornadoes, earthquakes, or bullets, for example, or per pursuant to other regulatory ordinances.

The building system of the present invention is particularly well-suited for easily adding rooms to existing buildings, such as residential homes, as do-it-yourself (DIY) projects, as well as for adding low cost outbuildings, creating affordable homes for use in developing nations, enabling rapid erection of emergency buildings in disaster areas, and for use as lightweight substantial military shelters, for example. A preferred method of assembly is described below with respect to a four-sided building. It will be appreciated by those of ordinary skill in the art that buildings having different floor plan configurations may be assembled using the structural components described and illustrated herein. In addition, the studs 40, 50 of the inventive building system can be used as roof supports in hurricane resistive roof structures As discussed above, the corner posts may be fastened directly to an underlying concrete floor pad F, such as that described in the Inventor's Co-Pending Applications, or as shown in FIGS. 6 and 15, the corner post may be maintained within footings 30 that are submerged within holes dug into the ground. Each footing comprises a base 32 that is placed within a hole approximately 4 feet (i.e. 1.25 m) deep (or sufficiently deep so as to be below the frost line in the zone where the structure is being built) and an elongated tube 34 that extends above the base as shown, but still approximately 1 foot (i.e. 0.3 m) below the ground level G. The tube 34 is preferably fabricated of a cardboard material; however, other light-weight materials may be employed instead, such as plastic piping Once the footings 30 are all placed within their respective holes, concrete is poured into the tube 34 to fill the tube 34 and base 32. [Concrete or any other cement-containing material may be used; however, for ease of explanation, the remaining discussion will refer to concrete.] The base 32 may alternatively be formed from a wood box or bag of cloth (not shown) sufficiently strong to retain the concrete. An inverted footing 30 may be used as a funnel to facilitate the concrete pour into the submerged footing 30. A corner post 11 is then inserted through the tube 34 and into the concrete in the footing, the corner post 11 then consequently being held in place by the concrete. The holes containing the footings/corner posts are then backfilled with dirt, and the corner posts adjusted to a plumb vertical position locating the corner or angle of the structure being built. Exemplary footings are the bell-shaped pre-molded concrete construction footing forms vended by Bigfoot Systems, Inc. (Nova Scotia, Canada).

Figure 5:
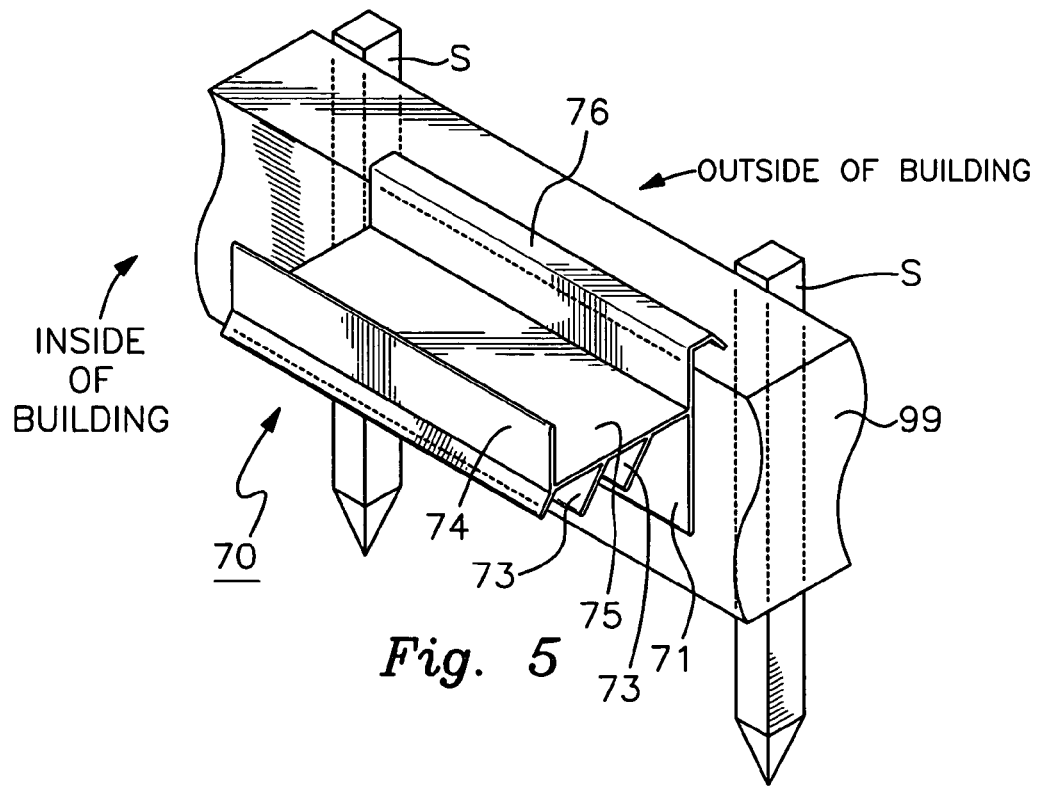
FIG. 5 is a perspective view of the exterior sill plate secured to a temporary form with stakes to secure the form to the ground prior to the concrete pour. The exterior sill plate is attached to the form and imbeds the concrete when fabricating the underlying floor pad of the building.

As illustrated in FIG. 6, for example, sill plates 70 are arranged about the corner posts and cut at each end at 45 degrees and in a pattern to fit the corner posts. [Alternatively, C-channel bottom plates 86*b* may be employed instead of the inventive sill plates 70, as shown in FIG. 8C, for example; however, for ease of explanation, the remaining discussion will be with respect to the sill plates 70, the phrase "sill plate" including c-channel bottom plates, as discussed above]. Preferably, the sill plates 70 are initially secured to a temporary lumber form 99 defining the perimeter outline of the floor pad to be filled with concrete, such forms laid out as a 2 inch×4 inch lumber form, as shown in FIG. 5. The combination sill plate/form is secured to the underlying ground using stakes S, as best shown in FIG. 5, such that the stake side of the form faces the outside of the building and the three underlying angled plates 73 face the inside of the building, each of said angled plates set an angle of less than 90 degrees relative to an upper base plate 75. Prior to the concrete pour, re-enforced steel rebar or mesh (not shown) may be laid down between the sill plates 70, as is generally done in fabricating concrete foundations in conventional building construction. When the concrete is poured, the concrete runs and is hand rammed under the angled plates 73 and against the back wall plate 71 of the sill plate, thereby embedding the sill plate within the concrete foundation as the concrete hardens.

In areas where concrete is not available after disasters or in developing nations, a similar floor could be made of asphalt, clay, dirt, stones, sand, or of compacted materials from the region that may typically be used in fabricating interior floors. The lumber form 99 and stakes S may be removed, leaving the long outside edge 76 of the sill plate exposed, the outside edge 76 functioning to deflect rain water and insects, similar to the sill plate embodiment described in the Inventor's Co-Pending Applications.

Next, interior shear wall sheets 62 and exterior shear wall sheets 60 are placed inside the sill plate 70 as shown in FIG. 7, with the exterior sheet 60 abutting the front wall 74 of the sill plate and the interior sheet 62 on sheet abutting the back wall 76 of the sill plate. The edges of the sheets closest to the adjacent corner post may then be mechanically and/or adhesively secured within the interior indentations 15a, 15b of the corners post 11. The top view of FIG. 7 shows best the alignment of respective shear wall sheets within a corners post. The opposite edges of the shear wall sheets are engaged within the corresponding longitudinal channels 45, 47 of the connecting stud 40, as illustrated in FIGS. 3 and 7. Additional interior and exterior shear wall sheets are secured within the adjacent longitudinal channels 45, 47 of the stud 40, as shown in FIG. 7. The edge of the shear wall sheets may then be mechanically and/or adhesively secured to the exterior flanges 42, 44, as shown, using adhesives, screws or other suitable fasteners typically used in the art. When the application of this inventive system is used as an above ground support to elevate the building above potential flood plains as may be found in coastal areas, sections of the double shear wall structural sheeting can be replaced with gypsum board or other non-structural sheeting or cross buck shear wall design to provide areas where flood or surge water can break away those non-structural sections or flow out through openings in the cross bucks, thereby relieving pressure on the entire structure. Such break-away sections relieve the water pressures without altering the ability of the structure to support the building above while still providing shear strength, preventing side-to-side racking of the support structure and still provide paths for the water to drain out as the water level recedes.

Figure 9:
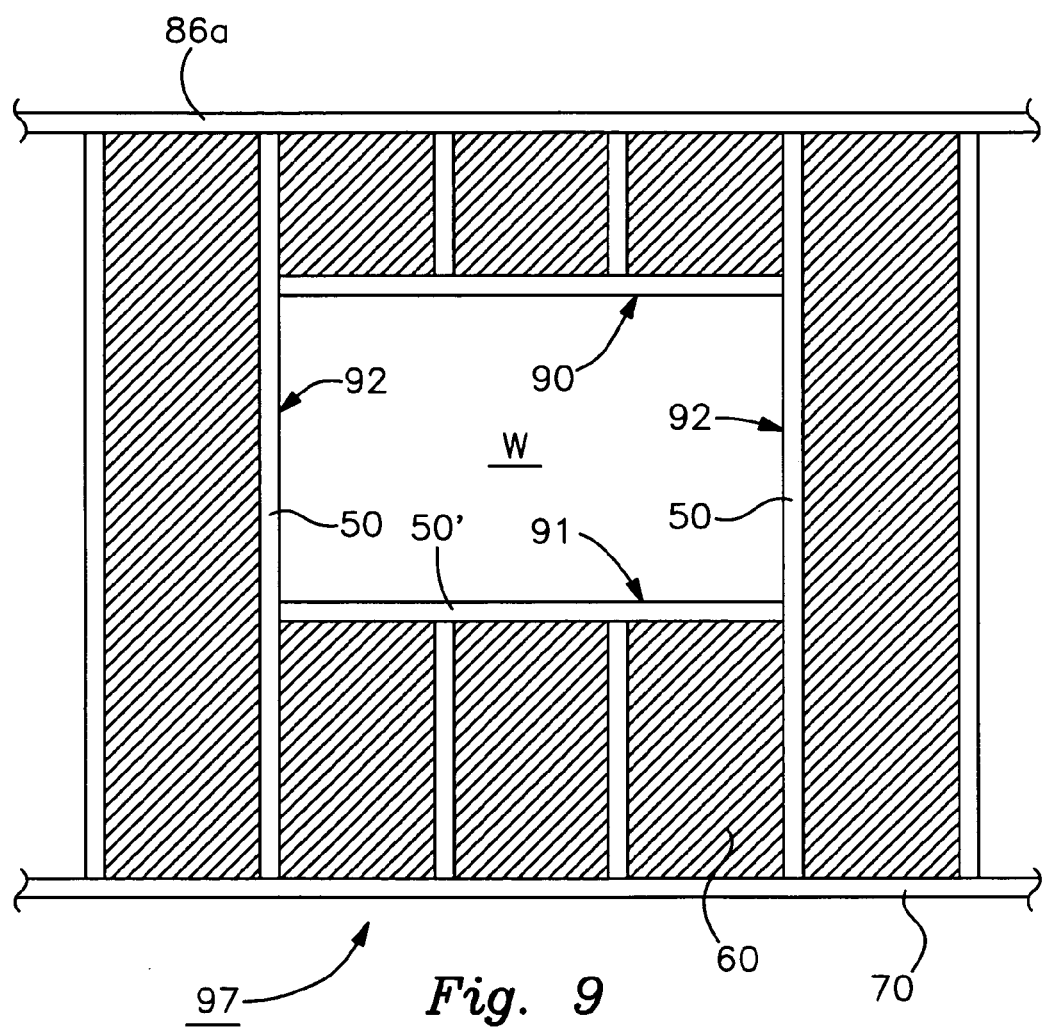
FIG. 9 is a front view of the assembled building per the present invention, illustrating a window opening and the wall assemblies above and below the opening.
Figure 14:
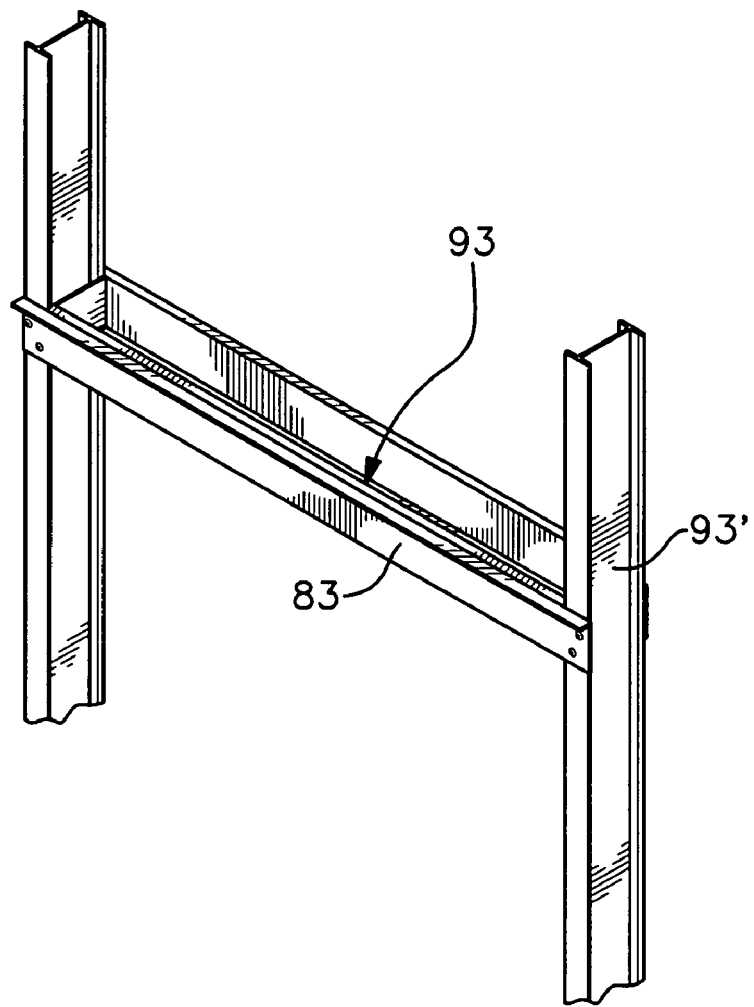
FIG. 14 is a partial perspective view of the window frame housing assembly illustrated in FIG. 13 fixed on top of a second embodiment of the inventive connecting stud.

This progression of securing interior 62 and exterior 60 shear wall sheets within the underlying sill plate(s) and to adjacent connecting studs 40 continues up to a first window opening W (see FIG. 9) or door opening (not shown). Here, the connecting stud 50 shown in FIGS. 4, 4A is used to form the vertical side edges 92 of the window or door opening. Preferably, the connecting stud 50 is cut to a desired length in order to form the horizontal top edge 90 and horizontal bottom 91 edge of the window opening W (FIG. 9). Preferably, before inserting the stud 50 to form the bottom edge 91, conventional insulation or desired fill material is first added into the lower wall section 97 of the framing as may also be done to the wall section above the rough opening prior to affixing the top plate 86a. Alternatively, C-channels may be cut and affixed to the vertical studs 50 into which horizontal studs 50, 83, or 93 may be inserted, as shown in FIG. 14. Interior and exterior shear wall sheets as well as connecting studs 40 are likewise cut to a desired width in order to accommodate the location of the window opening, as shown in FIG. 9. An exterior strip of wood or polyester (not shown) may be applied to the channels formed between the web portions and flanges of studs 50 lining the four inside edges 90, 91, 92 of the window opening to create a nailing buck for attachment of windows or doors supplied and fit conventionally by others.

Figure 11:
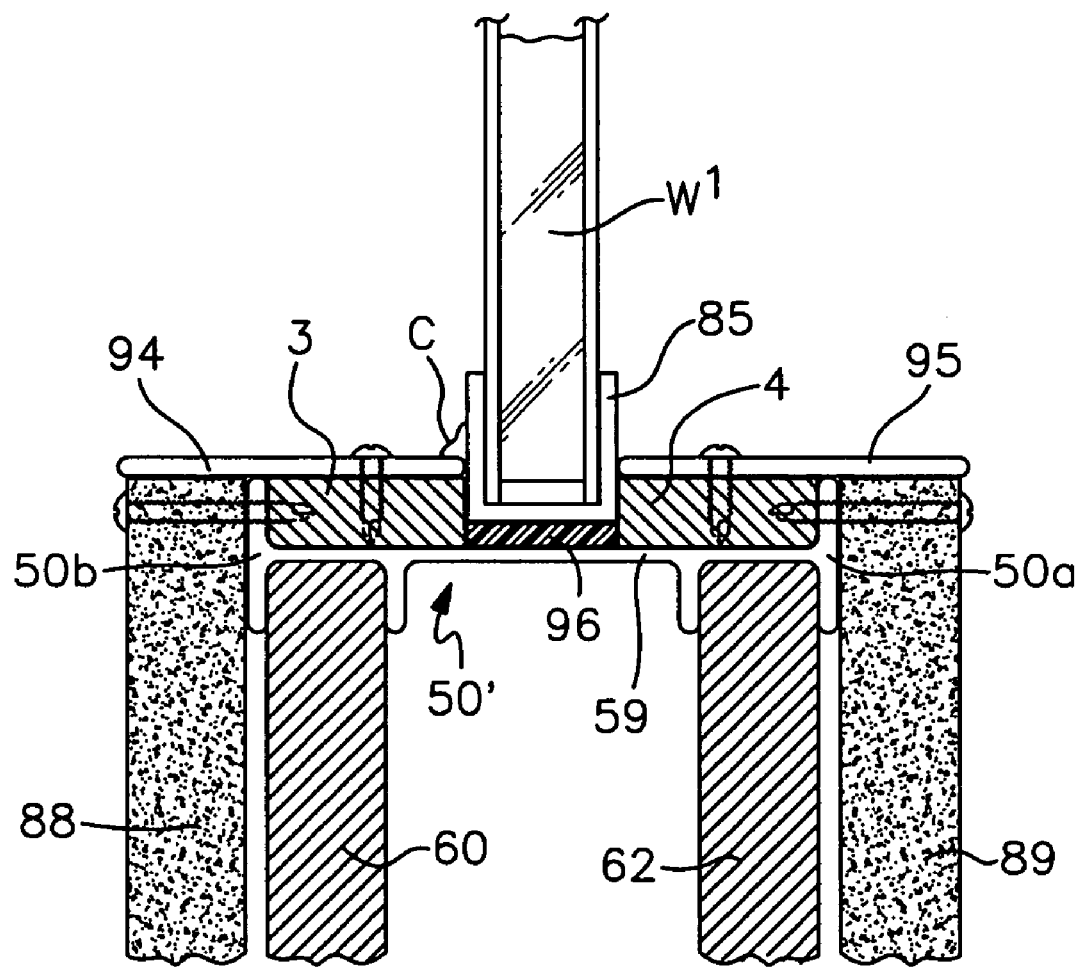
FIG. 11 is a sectional view of one embodiment of the surrounding window opening frame section of the inventive building design showing a novel window frame housing assembly.

Another aspect of the inventive building system is the ability to install windows and doors without using mechanical fasteners or adhesives to secure the window or door into the rough opening. FIG. 11 illustrates a sectional view of a window opening, wherein the window $W^1$ is installed, and illustrates how the top edges of the exterior and interior shear wall sheets 60, 62 may be engaged within the channels 55, 57 of the stud $50^1$ used to frame out the lower edge 91 of the window opening W (studs 50 and $50^1$ are identical, except stud $50^1$ is referenced accordingly to indicated that it is positioned on the lower edge 91 of the fenestration). A narrow C-channel frame 85, such as that shown in FIG. 11, is attached to a plate glass or insulated window $W^1$ with adhesive to serve as a frame surrounding and encasing the one piece glass window $W^1$ and to serve as a male channel inserted into a female channel created between fill strips 3, 4 upon stud $50^1$, with fill strip 3 positioned on the exterior side of the window and fill strip 4 positioned on the interior side. The preferred C-channels 85 for framing the window are made from a high strength pultrusion containing 70% to 85% fiberglass content in order to have a nearly identical expansion and contraction coefficient as the plate glass of the window $W^1$. Fill strips 3, 4 may be of different sizes depending upon the thickness of the window frame 85 and are preferably formed of plastic, wood, or other types of wood replacement materials that are insect resistant, water-proof, and UV light stable. In the preferred embodiment, the exterior fill strip 3 is adhesively attached to stud $50^1$, lining the exterior perimeter of window opening W. At least one expansion pad 96 is positioned upon the web portion 59 of the stud $50^1$, after which the window $W^1$ is inserted into the rough opening W and onto the pads 96, and further engaged within the studs 50 forming the vertical edges 92 of the window opening W. The expansion pads 96 may also be placed along the sides of the window opening between the frame 85 and studs 50 forming the vertical edges 92 of the window opening W (not shown). The expansion pads 96 are preferably formed of rubber or similar elastomeric material for the purpose of relieving expansion and contraction stresses in the window that occur from day-to-day and season-to-season. Preferably, two or more pads 96 (about ⅛ to ½ inch thick and about 2 to 3 inches wide, for example) are placed below the window frame 85 along the web portion 59 of the lower stud $50^1$ and spaced about every 16 inches. A quantity of fill material (not shown), including but not limited to, fiberglass, mineral wool, and foam insulation, may be added to surround the window frame 85 and prevent air passage. Specifically, the fill material fills in the gaps created between the window assembly and the studs 50 framing the window opening W as well as the gaps between adjacent expansion pads 96. An interior fill strip 4 is then fitted into the interior chamber of the horizontal stud $50^1$ (FIG. 11), and both the interior and exterior fill strips 3,4 are capped with finishing jambs 94, 95 which are secured upon the exterior 50b and interior 50a flanges of the stud and in turn, are mechanically fastened to studs 50 $50^1$ surrounding the window at edges 91, 92. The window $W^1$ does not need to be fastened by any adhesive or mechanical fastener, yet it is securely locked into position between fill strips 3, 4 and can be easily repaired if damaged by removing the interior jamb 95 or exterior jamb 94 and fill strips 3,4. Thus, a window $W^1$ of any thickness may be mounted within fenestration assembly formed by jambs 94, 95 and horizontal stud $50^1$ to create a novel window frame housing assembly. Caulking C or similar packing material is added to tightly seal the window frame 85 against the elements and to prevent air leakage. The interior 95 and exterior 94 window jambs may be selected from weather proof board (e.g. polyester, composite, marble, or wood) (not shown), if desired, and insulation or fill material may be placed within any gaps between the pads, window jambs, and studs 50, $50^1$.

Figure 12:
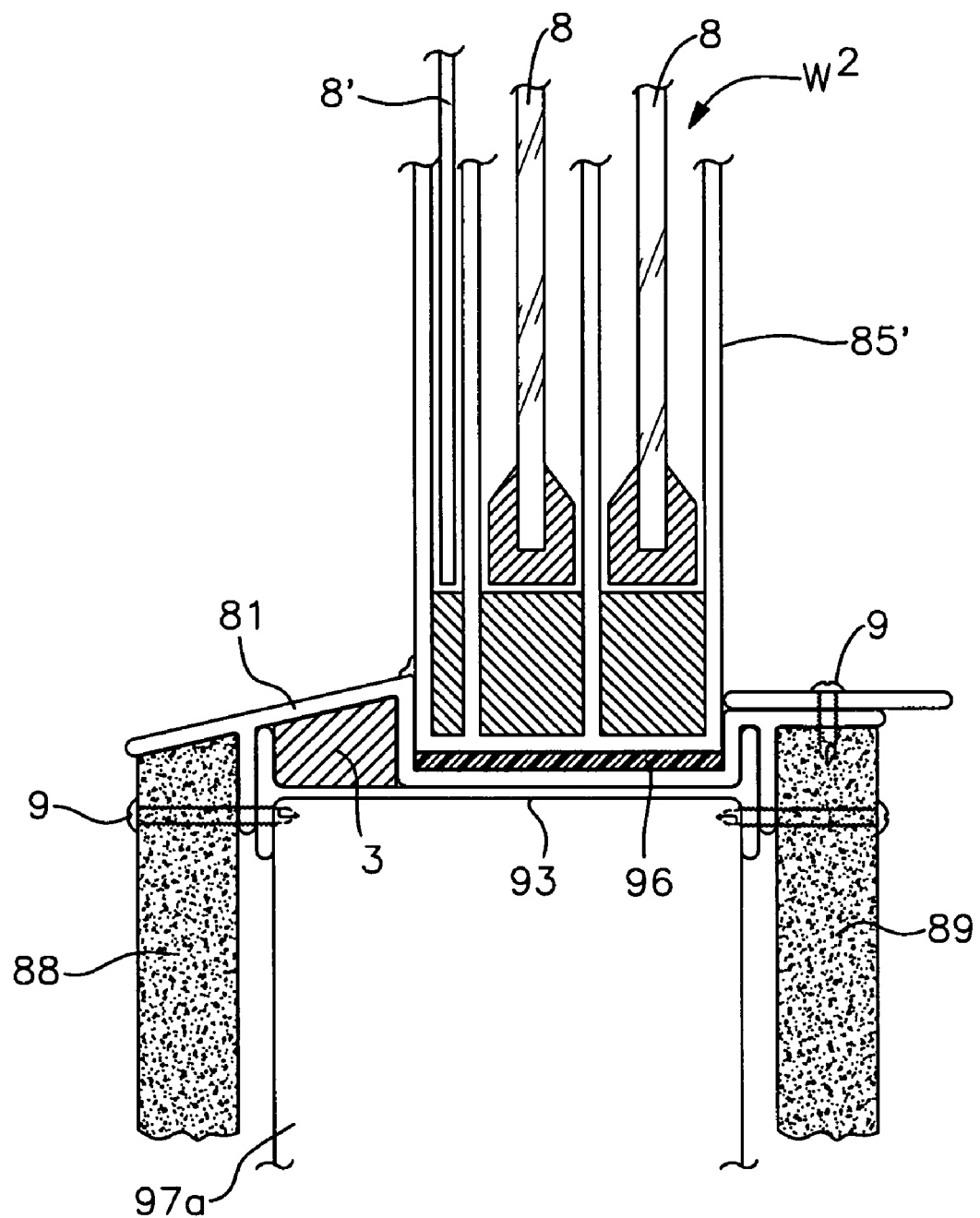
FIG. 12 is a sectional view of a second embodiment of the surrounding window opening frame section of the inventive building design showing a second novel window frame housing assembly.
Figure 13:
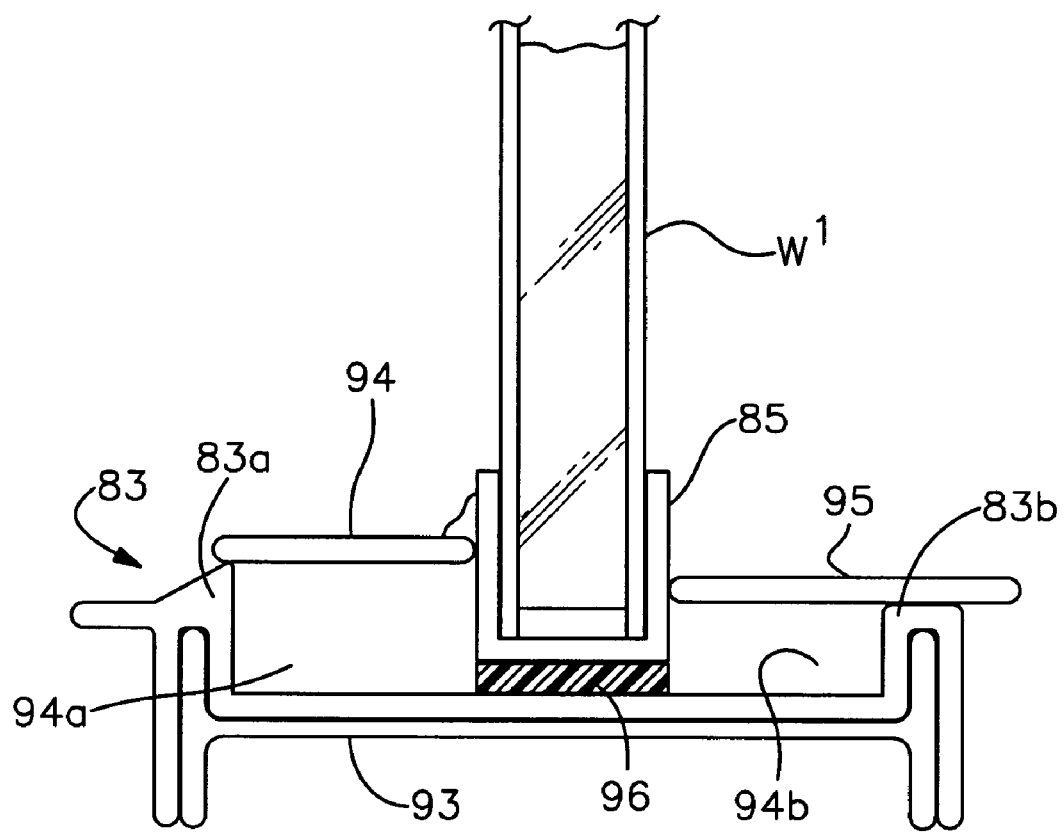
FIG. 13 is a sectional view of a third embodiment of the surrounding window opening frame section that may be used in lieu of the window frame housing assembly shown in FIG. 12.
Figure 13A:
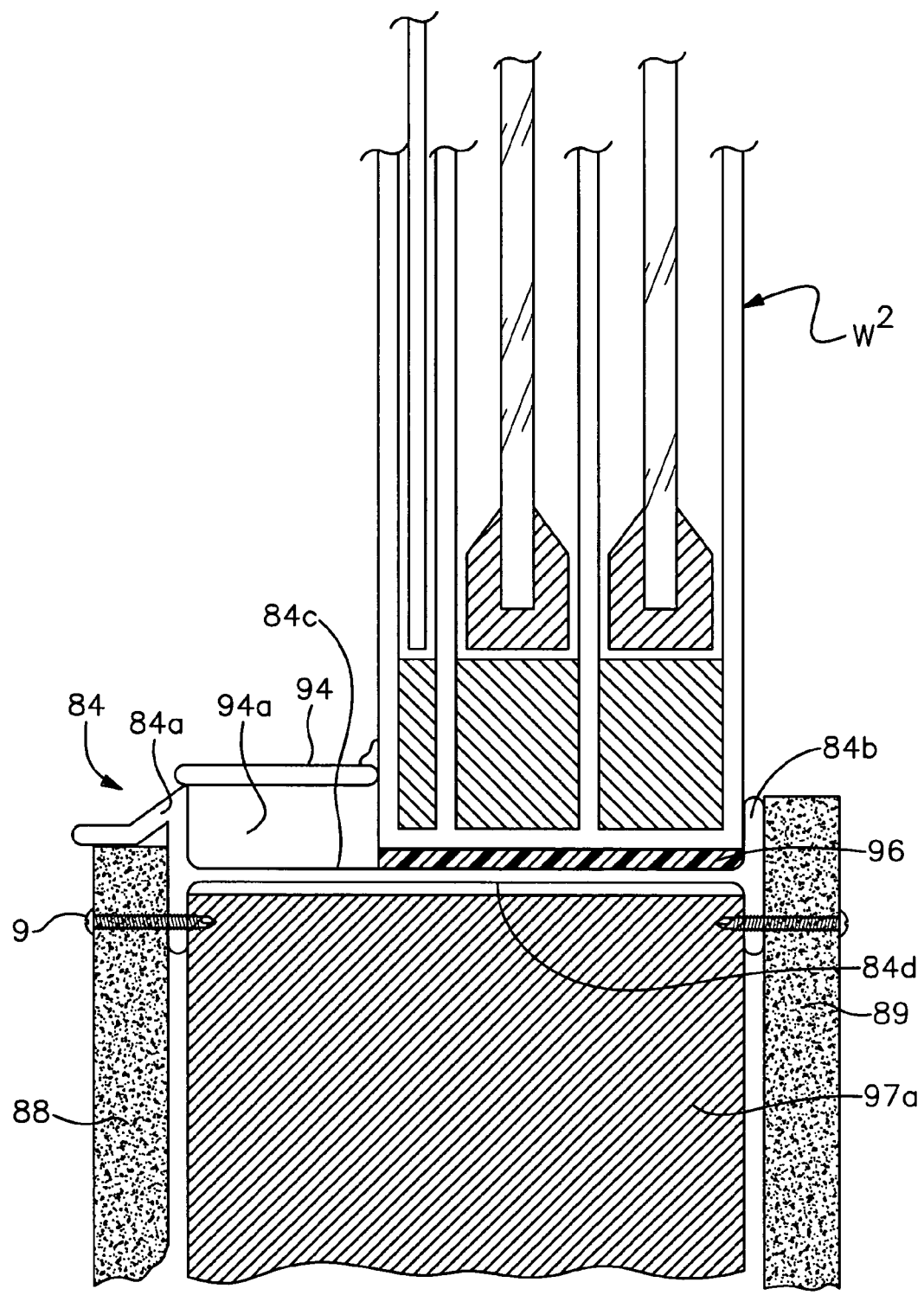
FIG. 13A is a sectional view of fourth embodiment of the surrounding window opening frame section wherein the underlying wall section is a solid structural insulated panel (SIP) formed of wood, pre-cast concrete slab, or hollow concrete block(s).

FIG. 12 is a sectional end view of another window fenestration design wherein exterior and interior shear wall sheets are not employed on the wall section 97 beneath the window opening W. Instead, the structure of the wall (referenced generally as 97a) may be a solid block of expanded polystyrene (EPS), solid pre-cast concrete slab, hollow concrete block(s), or chamotte (clay/straw mixture), forming a structural insulated panel (SIP). Alternatively, the wall 97a beneath the window opening W may be comprised of a solid panel or other solidly filled material, or it may be comprised of a skeletal structure of steel, wood, or composites (insulated or unfilled) (see FIGS. 12 and 13A), or a combination of both within a single wall. Another difference between the fenestration illustrated in FIG. 11 is that instead of connecting stud 50 being employed horizontally or vertically to form the edges 90, 91, 92 of the window opening, a simple I-stud 93 of the appropriate length is used to cap the wall structure. Alternatively, the I-stud 93 may be secured to adjacent I-beam studs 93$^1$, as shown in FIG. 14, instead of stud 50, since exterior and interior shear wall sheets are not used in this particular, and more universally applied, window fenestrations. As shown in FIGS. 12, 13, 13A, and 14, one of three different specially-designed C-channel members 81, 83, 84 may be used to form the horizontal edges 90, 91 and vertical edges 92 of the rough window opening W. [In FIGS. 12, 13, and 13A, only the lower horizontal edge 91 profile is shown.] In the embodiment shown in FIGS. 12, 13, and 14, the specially designed C-channel members 81, 83 are further configured to securely engage the underlying I-stud 93 or solid wall SIP structure 97a, as discussed above, and the window assembly. The embodiment shown in FIG. 13A is most suited for engaging an underlying solid wall or SIP structure 97a. In this embodiment, the C-channel member 84 comprises an interior female receptacle 84a and an exterior female receptacle 84b, with the exterior female receptacle 84b configured to engage the outer edge of the solid wall 97a, for example, and the interior female receptacle 84a configured to engage and totally surround the window assembly W$^1$, W$^2$ within the window opening W. In all of the embodiments shown in FIGS. 12, 13, 13A, and 14, exterior fill strips 3 and expansion pads 96 may also be used (see FIG. 12). Finally, the fenestration design shown in FIG. 12, for example, is especially well-suited for the window assembly W$^2$ shown in FIG. 12, which is comprised of a screen 8$^1$ and a pair of vertically sliding glass panels 8 surrounded by a window frame casing 85$^1$.

It will be readily recognized by those of ordinary skill in the art that the window assemblies W$^1$, W$^2$ illustrated in FIGS. 11-12, as well as any other window assembly designs now known or later developed in the art, may be employed with any of the window fenestration embodiments of the present invention illustrated in FIGS. 11-13, 13A, and 14. Moreover, in FIG. 11, the chambers (which are shown in FIG. 11 with fill strips 3, 4) may be of different widths, depending upon the location of the window assembly upon the stud 50$^1$. Similarly, the window assembly shown in FIG. 13 may also be moved anywhere upon the stud 83 in order create chambers 94a, 94b of varying widths (for ease of illustration, the chambers 94a, 94b shown in FIGS. 13-13A do not contain fill strips or show screws penetrating therethrough). In all of the window fenestration embodiments, the window assembly may be positioned flush against the inner surface of the interior flange 50a, 83b, 84b, of the bottom stud 50$^1$, 83, 84, thereby creating only one exteriorly positioned chamber 94a, as shown in FIGS. 13A and FIG. 12 (the chamber in FIG. 12 is shown with the fill strip 3 inserted therein). Similarly, in all of the window fenestration embodiments, the window assembly may be, instead, positioned flush against the inner surface of the exterior flange 50b, 83a, 84a of the bottom stud, thereby creating only one interiorly positioned chamber 94b. All of the chambers are capped with a finishing jamb 94, 95, as shown.

Once the window opening (or similarly, a door opening) is formed as described above, the progression of inserting connecting studs 40 and shear wall sheets 60, 62 to each other within the underlying sill plate 70 continues until another window opening or door opening is reached. If a door way is desired, connecting stud 50 is also used to frame out the two sides of the door jamb and top of the door opening, similar to the method using studs 50 for framing out a window opening W, as discussed above. Strips of wood, plastic, cementitious material, or nailable material may then be mechanically and/or adhesively secured to the inside door jamb to create nailing surfaces in order to conventionally hang a door, as described in Inventor's Co-Pending Applications. Once the door is secured within the door opening, the exterior of the door frame may be finished for esthetics.

Assembly of the exterior wall of the building, including the steps of framing out door and window openings, is continued as described above until an inside wall location is desired or the adjacent corner post is reached. For the creation of an inside wall section, a simple slot is cut out of the interior wall 74 of the sill plate 70, and a second C-channel member 86$^1$b is butted against the cut out section, thereby forming the sill plate for the interior wall within which the interior wall sheets 64 are engaged (FIGS. 8A, 8B, and 8C). The C-channel sill plate 86$^1$b is secured to the underlying foundation perpendicular to the exterior sill plate 70 from which it extends. The front wall 74 of the exterior sill plate 70 accommodates the T-post 21, which is inserted and subsequently engaged within both sill plates 70, 86$^1$b.

If desired, standard insulation may be used to fill the hollow spaces 95 created between the interior and exterior shear wall sheets 60, 62 or the hollow space 90 between the interior sheets 64 extending from the T-posts 21 forming the interior rooms of the building. If standard insulation is not used, these hollow spaces may be filled with various fill material 80 for insulation or sound attenuation as described above after which a top plate 86, 86a (see FIGS. 8A-8C), such as a C-channel top plate illustrated in the Inventor's Co-Pending Applications, is attached to the studs 40, 50 to seal the fill material 80 therein and distribute the live and dead loads from above. Once the C-channel top plate(s) 86a are attached to the exterior perimeter wall of the building thus constructed, truss mounts illustrated in the Inventor's Co-Pending Applications, for example, or straps, may be secured to the building, and straps may be added to locate and restrain trusses, rafters, or the roof structure.

Once the building structure is assembled as described above, the exterior of the building may be finished by applying decorative board 88, brick, stucco, paint, stain, or any trowled-on surface material. The interior of the building may be finished as well with gypsum board 89, stucco, or any trowled-on surface material. Preferably, as shown in FIGS. 7, 8, and 10A, a space 2 is provided between the shear wall sheets 60, 62 and the immediately adjacent exterior 88 and interior 89 sheets (FIGS. 7-8) as well as between shear wall sheets 60, 62 and the immediately adjacent insulation I (FIG. 10A). Provision of this air space 2 is a unique feature of the inventive design as it functions to channel away any water from the wall which may have penetrated the roof or exterior finish, thus enabling the wall to dry itself out after a rain or during high humidity conditions, thereby preventing damage caused by moisture, such as mold, mildew, or rising damp, for example.

The invention claimed is:

1. A shear wall building system comprising:
    (a) at least four corner posts, each of said posts arranged about a floor pad and each having a top end and a bottom end, each of said corner posts further having a longitudinal outer body comprising four corners, said corners including (i) a pair of diagonally opposing corners; (ii) an outer most exterior corner positioned between said diagonally opposing corners, and (iii) an inner most corner located diagonally opposite said outer most exterior corner and between said pair of diagonally opposing corners;

(b) one or more first exterior shear wall sheets secured to each of said corner posts, said one or more shear wall sheets having a first outer edge secured to one of said diagonally opposing corners of one of said corner posts;

(c) one or more interior shear wall sheets secured to each of said corner posts, said one or more interior shear wall sheets having a first outer edge secured to said inner most corner of one of said corner posts;

(d) one or more longitudinal sill plates having opposite ends secured to adjacent corner posts along said floor pad, wherein at least one of said sill plates comprises angled plates embedded within an underlying concrete foundation wherein said angled plates are set at an angle of less than 90 degrees relative to an upper base plate of said one or more longitudinal sill plates;

(e) one or more shear wall connecting studs secured within each of said sill plates and positioned a distance from an adjacent corner post, each of said connecting studs including a longitudinal channel formed by a longitudinal central web portion, an outer flange, and an intermediate flange, of said connecting stud;

(f) each of said interior and exterior shear wall sheets each having a second outer side edge secured within said longitudinal channel of said shear wall connecting studs; and (g) at least one horizontal top plate secured to the top ends of said studs and corner posts.

2. The building system of claim 1, further including a quantity of insulation housed between said exterior and interior shear wall sheets and positioned such that a first air space is created between said interior shear wall sheet and said insulation and a second air space is created between said exterior shear wall sheet and said insulation.

3. The building system of claim 1, wherein at least one of said corner posts has a hollow interior.

4. The building system of claim 3, including a fill material contained within said hollow interior of said corner post.

5. The building system of claim 4, wherein said fill material comprises one or more materials suitable for sound attenuation or thermal insulation.

6. The building system of claim 4, wherein said fill material is selected from the group of sand, grout, resin bonded aggregate, and concrete.

7. The building system of claim 1, wherein each of the diagonally opposing corners of each of said corner posts includes at least one longitudinal indentation extending from said top end to said bottom end of said corner post, said indentation configured to engage said outer edge of said exterior shear wall sheet.

8. The building system of claim 7, wherein said inner most corner of each of said corner posts includes at least one longitudinal indentation extending from the top end to the bottom end of said corner posts, such that said at least one interior indentation is aligned with and runs parallel to an adjacent longitudinal indentation of one of said exterior diagonally opposing corners.

9. The building system of claim 1, said outer flange of said connecting studs being an interior flange and an exterior flange, and said system further including (a) an interior non-shear wall sheet adjacent said interior shear wall sheet and secured to said interior flange of said connecting stud and said corner post; (b) a second exterior wall sheet adjacent said first exterior shear wall sheet and secured to said exterior flange of said connecting stud and said corner post; and (c) air spaces created between said first and second exterior shear wall sheets and between said interior shear wall sheets and said interior non-shear wall sheets.

10. The building system of claim 1, further including at least one T-post secured to said sill plate and positioned adjacent to said stud or corner post, said T-post having a top end and a bottom end and two exterior longitudinal indentations extending from said top and bottom ends of said T-post, said exterior indentations oriented adjacent to one another and each configured to receive an outer edge of one of said exterior sheer wall sheets, said T-post further including two interior indentations adjacent to one another and each configured to receive an outer edge of one of said interior shear wall sheets and a second interior wall sheets, wherein said second interior wall sheet is oriented perpendicular to said interior shear wall sheet within said interior indentation.

11. The building system of claim 10, wherein said T-post has a hollow interior.

12. The building system claim 11, including a fill material contained within said hollow interior of said T-post.

13. The building system of claim 12, wherein said fill material is selected from the group of sand, grout, resin bonded aggregate, and concrete.

14. The building system of claim 12, wherein said fill material comprises one or more materials suitable for sound attenuation or thermal insulation.

15. The building system of claim 10, said connecting studs each having an interior flange and an exterior flange, and said system further including (a) an interior non-shear wall sheet adjacent to said interior shear wall sheet and secured to said interior flange of said connecting stud and said T-post; (b) a second exterior wall sheet adjacent said first exterior shear wall sheet and secured to said exterior flange of said connecting stud, said T-post, said sill plate, and said top plate; and (c) air spaces created between said first and second exterior shear wall sheets and between said interior shear wall sheet and said interior non-shear wall sheets.

16. The building system of claim 1, wherein the bottom end of each of said corner posts is engaged within a footing submerged within the ground below said floor pad, said footing comprising a base and an elongated tube extending from the base, said corner post secured within said tube, and wherein said base and said tube are further filled with a cement-containing material.

17. The building system of claim 1, wherein the bottom end of each of said corner posts is engaged within a footing submerged within the ground below said floor pad, said footing further filled with a cement-containing material.

* * * * *